(12) United States Patent
Yasui et al.

(10) Patent No.: US 10,095,959 B2
(45) Date of Patent: Oct. 9, 2018

(54) RECORDING MEDIUM AND LABEL PRODUCING APPARATUS

(71) Applicant: Brother Kogyo Kabushiki Kaisha, Nagoya-shi, Aichi-ken (JP)

(72) Inventors: Ryo Yasui, Nagoya (JP); Aiko Mizutani, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 125 days.

(21) Appl. No.: 15/087,420

(22) Filed: Mar. 31, 2016

(65) Prior Publication Data

US 2016/0292541 A1    Oct. 6, 2016

(30) Foreign Application Priority Data

Mar. 31, 2015   (JP) ................. 2015-073678

(51) Int. Cl.
*G06K 15/00* (2006.01)
*G06K 15/02* (2006.01)
(Continued)

(52) U.S. Cl.
CPC ........... *G06K 15/024* (2013.01); *G05B 15/02* (2013.01); *G06K 15/022* (2013.01); *G06K 15/16* (2013.01); *B41J 3/4075* (2013.01)

(58) Field of Classification Search
CPC ................ G09F 3/0295; G09F 3/0341; G09F 2003/0201; G09F 2003/0222; G06K 15/022; G06K 15/024; G06K 15/16; G05B 15/02; B41J 3/4075; B41J 15/044
USPC .... 358/1.1, 1.9, 2.1, 1.11–1.18, 1.6; 400/61, 400/615.2, 76
See application file for complete search history.

(56) References Cited

U.S. PATENT DOCUMENTS

| 5,374,130 A | * | 12/1994 | Hirono | ................... B41J 3/4075 |
| | | | | 101/288 |
| 2004/0033099 A1 | * | 2/2004 | Van Bever | ............. B41J 3/4075 |
| | | | | 400/615.2 |

(Continued)

FOREIGN PATENT DOCUMENTS

| JP | S64-006674 U | 1/1989 |
| JP | 2003-058062 A | 2/2003 |

(Continued)

OTHER PUBLICATIONS

Sep. 28, 2017—(JP) Notification of Reasons for Refusal—App 2015-073678, Eng Tran.

*Primary Examiner* — Chad Dickerson
(74) *Attorney, Agent, or Firm* — Banner & Witcoff, Ltd.

(57) ABSTRACT

A non-transitory computer-readable recording medium that stores a label production process program for executing steps on a computing portion of a terminal is provided. The terminal is connected to a label producing apparatus that produces a label. The label includes an information print part having information printed thereon, and a winding part connected to the information print part and to be wound on an adherend. The steps include a position determination step, a mark data generation step, and a mark data output step. In the position determination step, a position of a mark to be a guidepost for a position to wind the winding part on the adherend, is determined. In the mark data generation step, mark data to form the mark at the position determined, is generated. In the mark data output step, the generated mark data is output to the label producing apparatus.

2 Claims, 27 Drawing Sheets

(51) Int. Cl.
*G05B 15/02* (2006.01)
*G06K 15/16* (2006.01)
G06F 15/00 (2006.01)
B41J 11/00 (2006.01)
B41J 3/407 (2006.01)

(56) References Cited

U.S. PATENT DOCUMENTS

| | | | | |
|---|---|---|---|---|
| 2004/0189733 | A1* | 9/2004 | Yamamoto | B41J 3/4075 347/19 |
| 2004/0211521 | A1* | 10/2004 | Miyasaka | B41J 11/666 156/384 |
| 2005/0069368 | A1* | 3/2005 | Tanjima | B41J 3/4075 400/615.2 |
| 2005/0271444 | A1* | 12/2005 | Ueno | B41J 3/4075 400/613.1 |
| 2006/0263132 | A1* | 11/2006 | Yamamoto | B41J 3/4075 400/62 |
| 2014/0227017 | A1* | 8/2014 | Kanda | B41J 29/38 400/611 |
| 2015/0156342 | A1* | 6/2015 | Fries | H04N 1/00411 358/1.15 |

FOREIGN PATENT DOCUMENTS

| JP | 2004-299177 A | 10/2004 |
|---|---|---|
| JP | 2010-014929 A | 1/2010 |

* cited by examiner

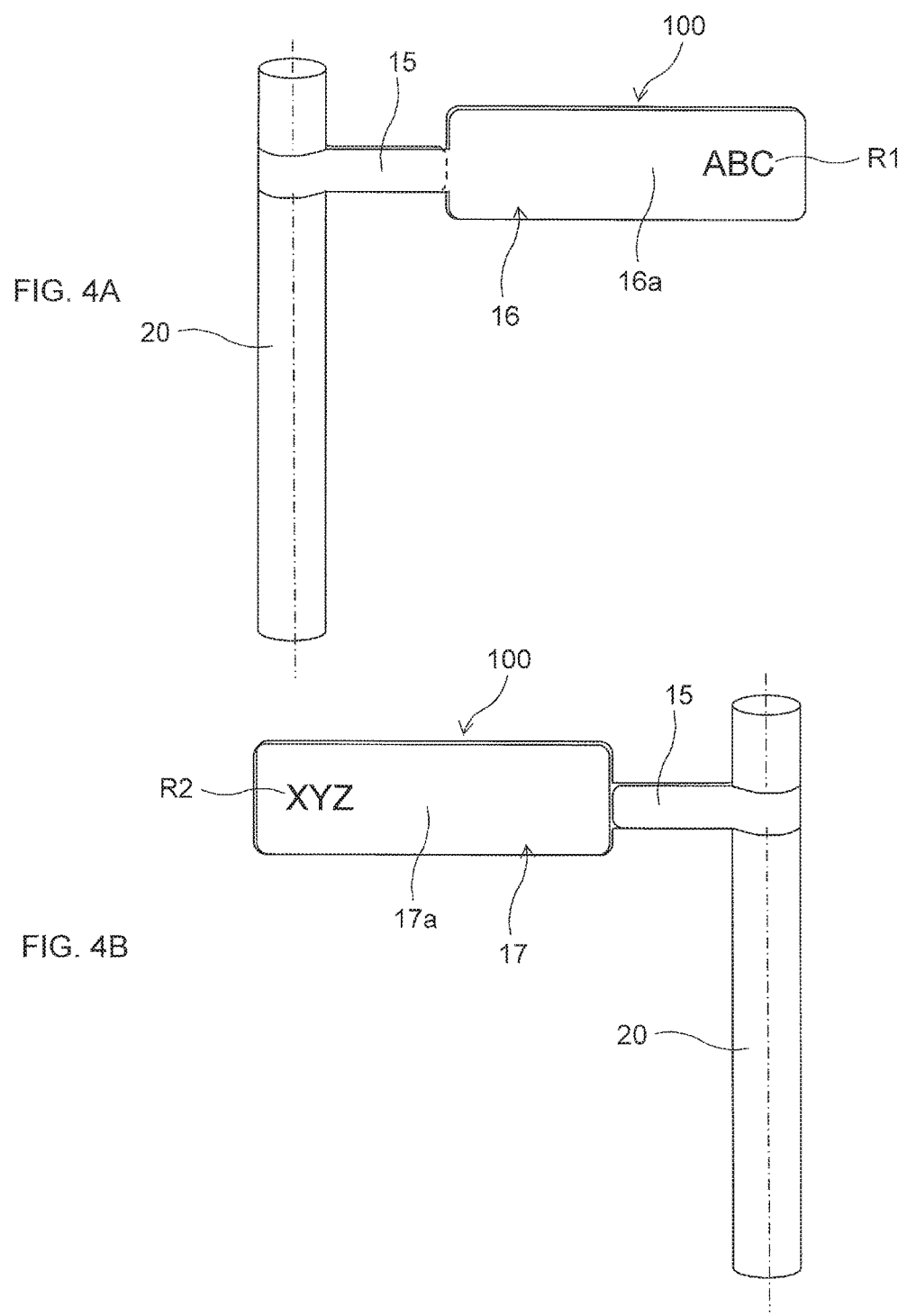

FIG. 5A
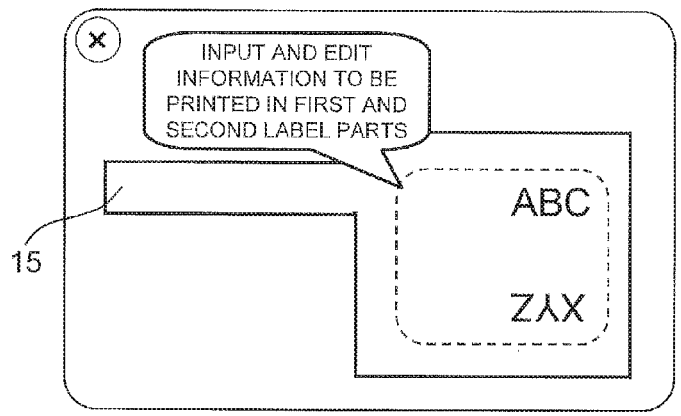
FIG. 5B
INPUT
SPACING DISTANCE $\iota$ =10 mm AND
OUTER DIAMETER d = 5 mm OF CABLE
FIG. 5C
POSITION OF AIM LINE
$a = 50 - (d * 3.14) - (\iota * 2)$
$= 14.3$
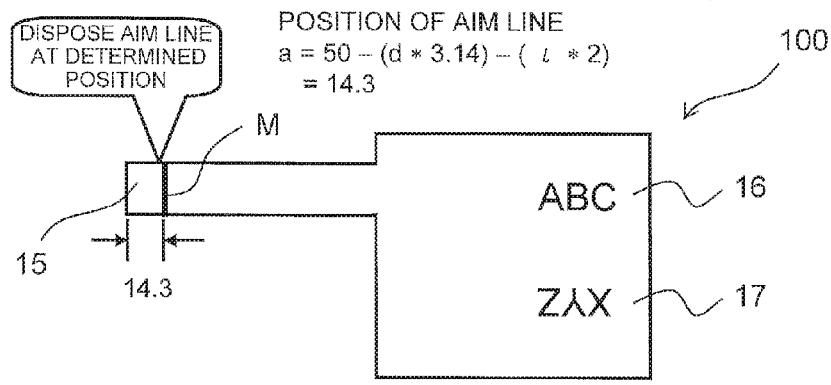

[FIG. 10A] 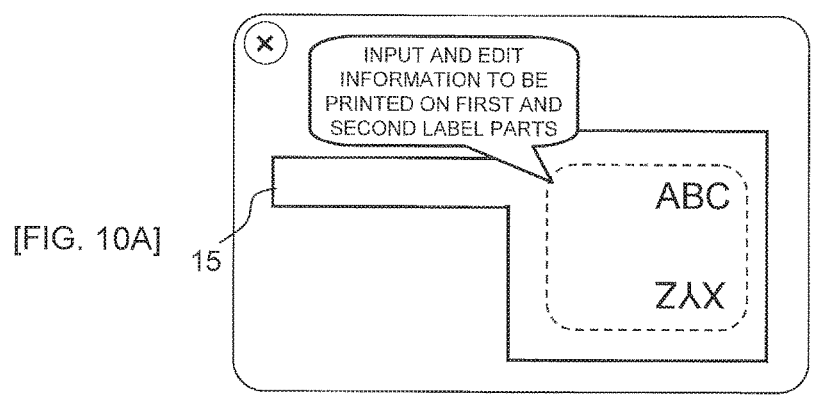
[FIG. 10B] INPUT
SPACING DISTANCE $\iota$ = 10 mm AND
OUTER DIAMETER d = 5 mm OF CABLE
[FIG. 10C] 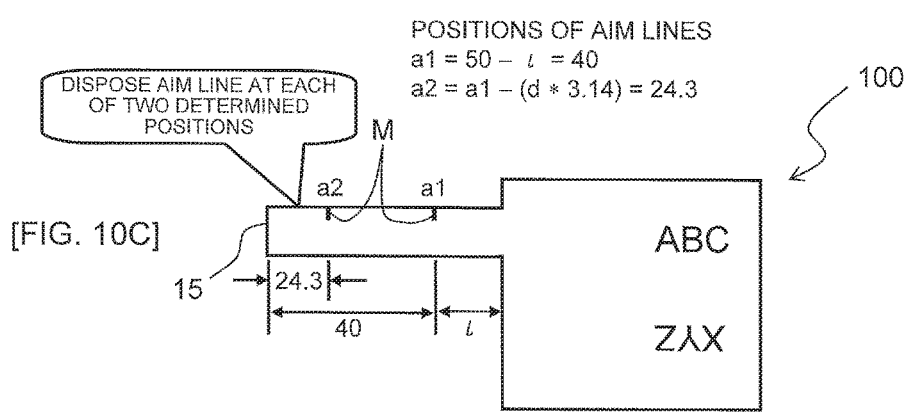

[FIG. 12A]
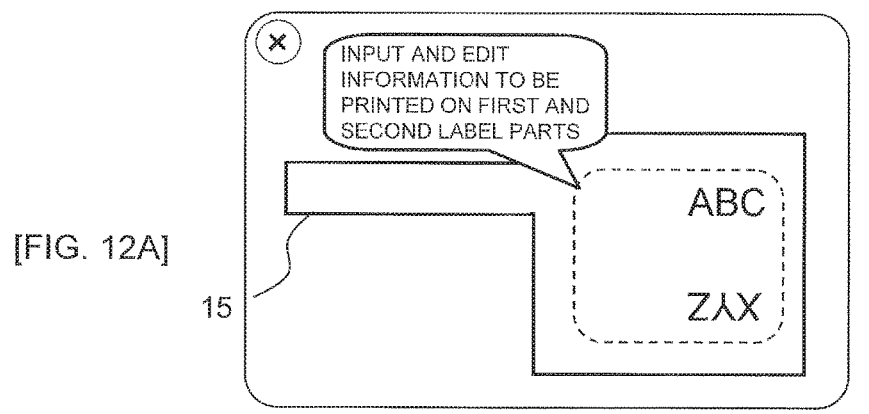
[FIG. 12B]
[FIG. 12C]
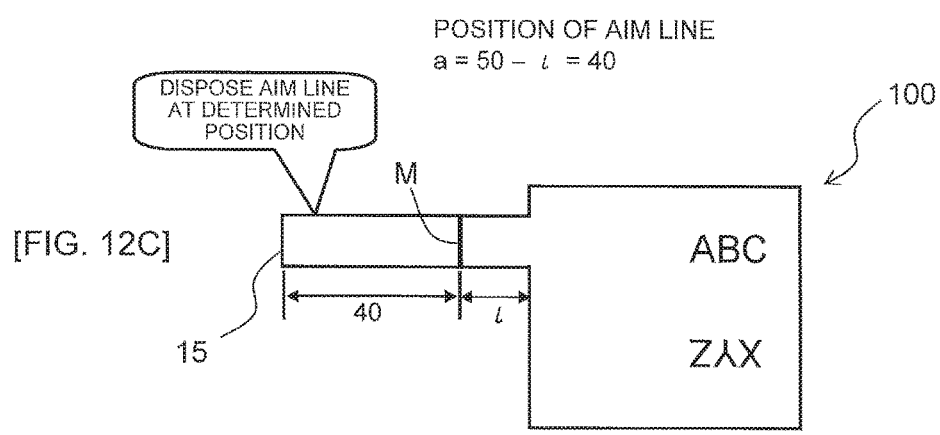

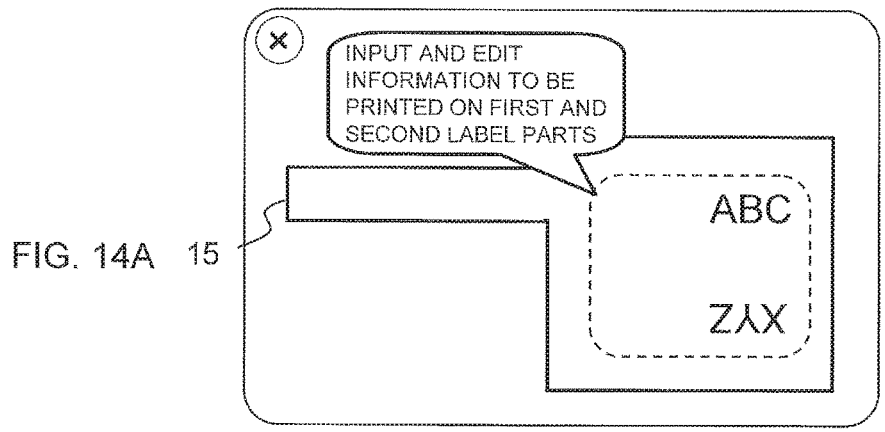
FIG. 14A
FIG. 14B  INPUT SPACING DISTANCE $\iota$ = 10mm
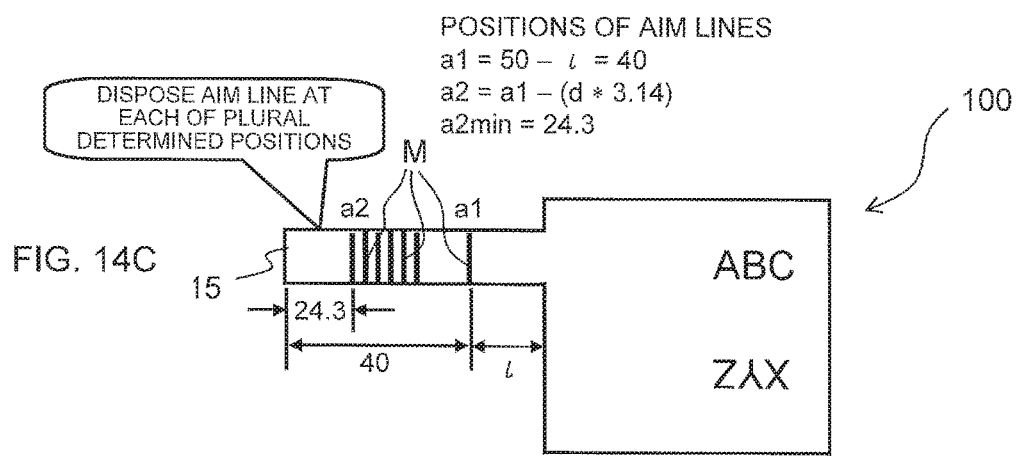
FIG. 14C

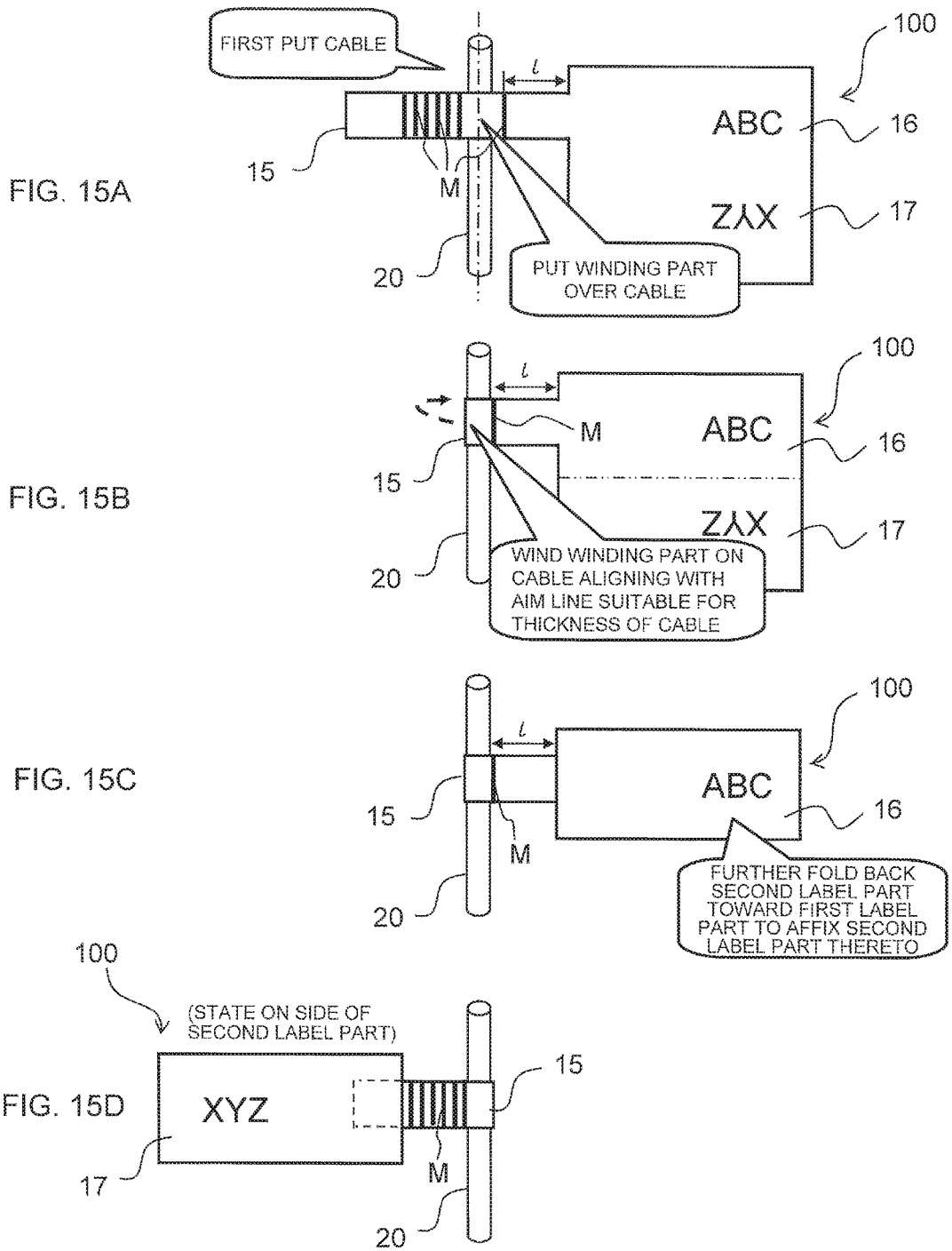

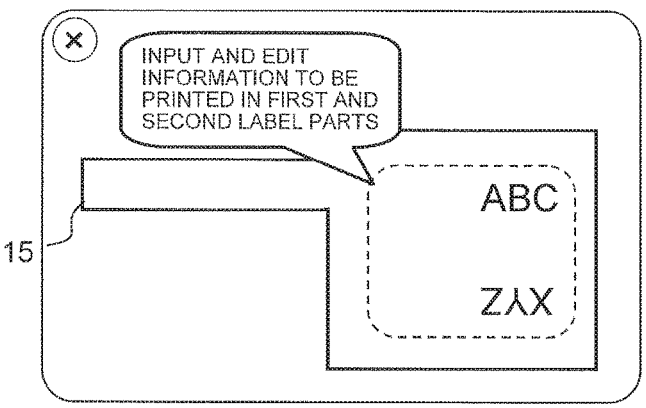
FIG. 16A
FIG. 16B INPUT OF BOTH OF SPACING DISTANCE $\iota$ AND OUTER DIAMETER d OF CABLE IS UNNECESSARY
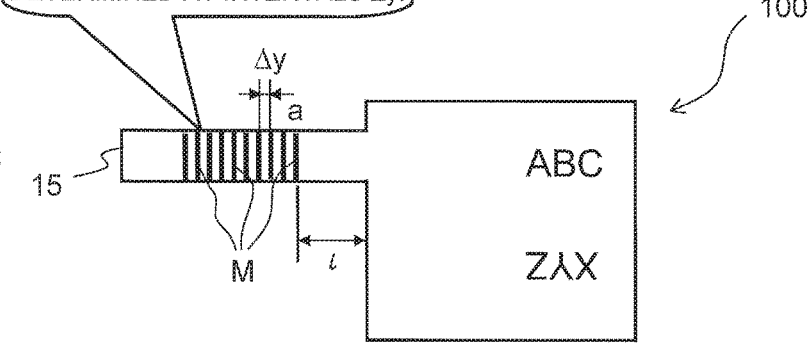
FIG. 16C

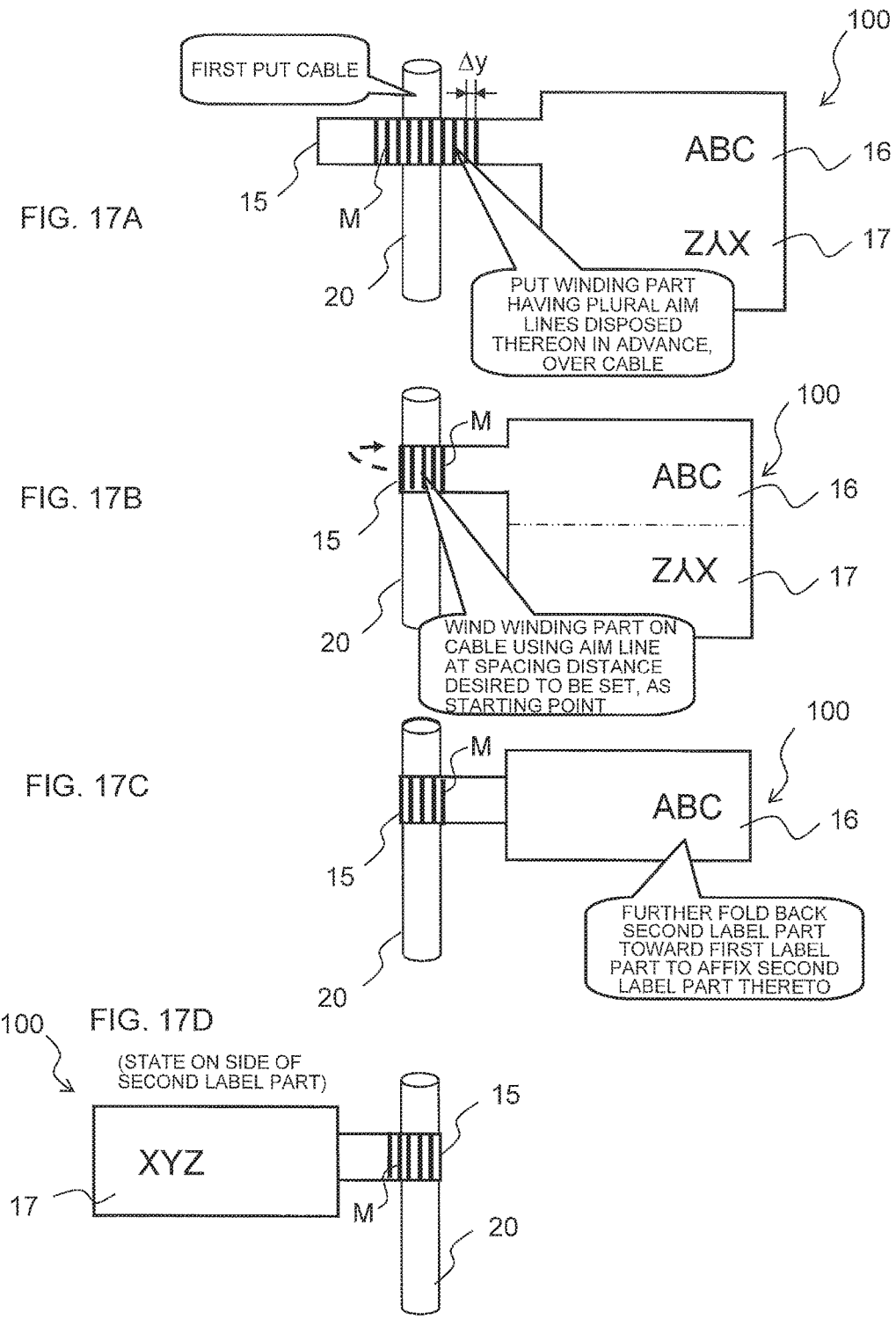

FIG. 18

```
P-LABEL

SPACING DISTANCE ( l ) :
    [          ] mm                          301

OUTER DIAMETER (d) OF CABLE :
    [          ] mm

[V] REDUCE PRINTING OF AIM LINES
```

COMPARATIVE EXAMPLE

EMBODIMENT

RECORDING MEDIUM AND LABEL PRODUCING APPARATUS

CROSS-REFERENCE TO RELATED APPLICATION

The present application claims priority from Japanese Patent Application No. 2015-073678, which was filed on Mar. 31, 2015, the disclosure of which is incorporated herein by reference in its entirety.

BACKGROUND

Field

The present disclosure relates to a recording medium having a label production process program stored thereon, and a label producing apparatus, to produce a label that is used being wound on an outer circumference of an adherend.

Description of the Related Art

A label to be wound on and affixed to an outer circumference of an adherend is known. This label (an affixed tag) includes a winding part (attaching part) to be wound on an adherend (a commercial product) and an information print part (display part) to have print object representing desired information (for example, a list price and the name of the product) printed thereon to display this information thereon.

When the above label is used, the winding part connected to the information print part is wound on the adherend having a circular-pipe shape or a cable shape. When this label is used, how far the information print part is spaced from the adherend can variously be considered in accordance with the use and the taste of a user. To realize the desired spacing distance, it is therefore convenient to have any guide function as to how the positions of the adherend and the winding part are aligned with each other during the winding. In the above prior art, nothing is especially taken into consideration as to the above point.

SUMMARY

An object of the present disclosure is to provide a recording medium and a label producing apparatus, that can easily space the adherend and the information print part from each other by a desired distance.

In order to achieve the above-described object, according to the aspect of the present application, there is provided a non-transitory computer-readable recording medium storing a label production process program for executing steps on a computing portion of a terminal connected to a label producing apparatus that produces a label including an information print part having information printed thereon, and a winding part connected to the information print part and to be wound on a circular-pipe-like or a cable-like adherend, the steps comprising a position determination step for determining a position of a mark to be formed on the winding part and to be a guidepost for a position to wind the winding part on the adherend, a mark data generation step for generating mark data to form the mark at the position determined in the position determination step, and a mark data output step for outputting the mark data generated in the mark data generation step to the label producing apparatus.

According to the present disclosure of this application, the label including the information print part and the winding part is produced. According to the present disclosure of this application, a mark to be the guide function is formed on the winding part. When the label production process program is executed by a computing portion of a terminal, at the position determination step, the position of the mark to be a guidepost of the position of the winding on the adherend is determined. At the mark data generation step, the mark data is generated corresponding to the above and, at the mark data output step, the mark data is output to the label producing apparatus.

As a result, the label producing apparatus produces a label including a mark, that has the mark formed at the above determined position. As a result, the user can easily and smoothly space the adherend and the information print part from each other by a desired distance by winding the winding part using the formed mark as a guide. As a result, the convenience can be improved.

BRIEF DESCRIPTION OF DRAWINGS

FIG. 4A is an explanatory view showing an outer appearance of the winding label used being attached to a cable.

FIG. 4B is an explanatory view showing an outer appearance of the winding label used being attached to the cable.

FIG. 5A is an explanatory view for explaining a position determination approach for an aim line to be formed on a winding part.

FIG. 5B is an explanatory view for explaining the position determination approach for the aim line to be formed on the winding part.

FIG. 5C is an explanatory view for explaining the position determination approach for the aim line to be formed on the winding part.

FIG. 10A is an explanatory view for explaining a position determination approach for the aim line to be formed on the winding part in a second embodiment of the present disclosure.

FIG. 10B is an explanatory view for explaining the position determination approach for the aim line to be formed on the winding part in the second embodiment of the present disclosure.

FIG. 10C is an explanatory view for explaining the position determination approach for the aim line to be formed on the winding part in the second embodiment of the present disclosure.

FIG. 12A is an explanatory view for explaining a position determination approach for an aim line to be formed on the winding part in a third embodiment of the present disclosure.

FIG. 12B is an explanatory view for explaining the position determination approach for the aim line to be formed on the winding part in the third embodiment of the present disclosure.

FIG. 12C is an explanatory view for explaining the position determination approach for the aim line to be formed on the winding part in the third embodiment of the present disclosure.

FIG. 14A is an explanatory view for explaining a position determination approach for aim lines to be formed on the winding part in a fourth embodiment of the present disclosure.

FIG. 14B is an explanatory view for explaining the position determination approach for the aim lines to be formed on the winding part in the fourth embodiment of the present disclosure.

FIG. 14C is an explanatory view for explaining the position determination approach for the aim lines to be formed on the winding part in the fourth embodiment of the present disclosure.

FIG. 15A is an explanatory view showing an approach of winding on a cable using the aim lines.

FIG. 15B is an explanatory view showing the approach of winding on the cable using the aim lines.

FIG. 15C is an explanatory view showing the approach of winding on the cable using the aim lines.

FIG. 15D is an explanatory view showing the approach of winding on the cable using the aim lines.

FIG. 16A is an explanatory view for explaining a position determination approach for aim lines to be formed on the winding part in a fifth embodiment of the present disclosure.

FIG. 16B is an explanatory view for explaining the position determination approach for the aim lines formed on the winding part in the fifth embodiment of the present disclosure.

FIG. 16C is an explanatory view for explaining the position determination approach for the aim lines formed on the winding part in the fifth embodiment of the present disclosure.

FIG. 17A is an explanatory view showing an approach of winding on a cable using the aim lines.

FIG. 17B is an explanatory view showing the approach of winding on the cable using the aim lines.

FIG. 17C is an explanatory view showing the approach of winding on the cable using the aim lines.

FIG. 17D is an explanatory view showing the approach of winding on the cable using the aim lines.

FIG. 18 is an explanatory view showing an instruction input screen displayed on the displaying portion of the operation terminal in a sixth embodiment of the present disclosure.

DETAILED DESCRIPTION OF THE PREFERRED EMBODIMENTS

Embodiments of the present disclosure will be described with reference to the drawings.

The first embodiment of the present disclosure will be described with reference to FIG. 1 to FIG. 9.

<Functional Configuration>

A functional configuration of a label producing apparatus 1 and an operation terminal 300 in relation to this embodiment will be described with reference to FIG. 1.

Figure 1:
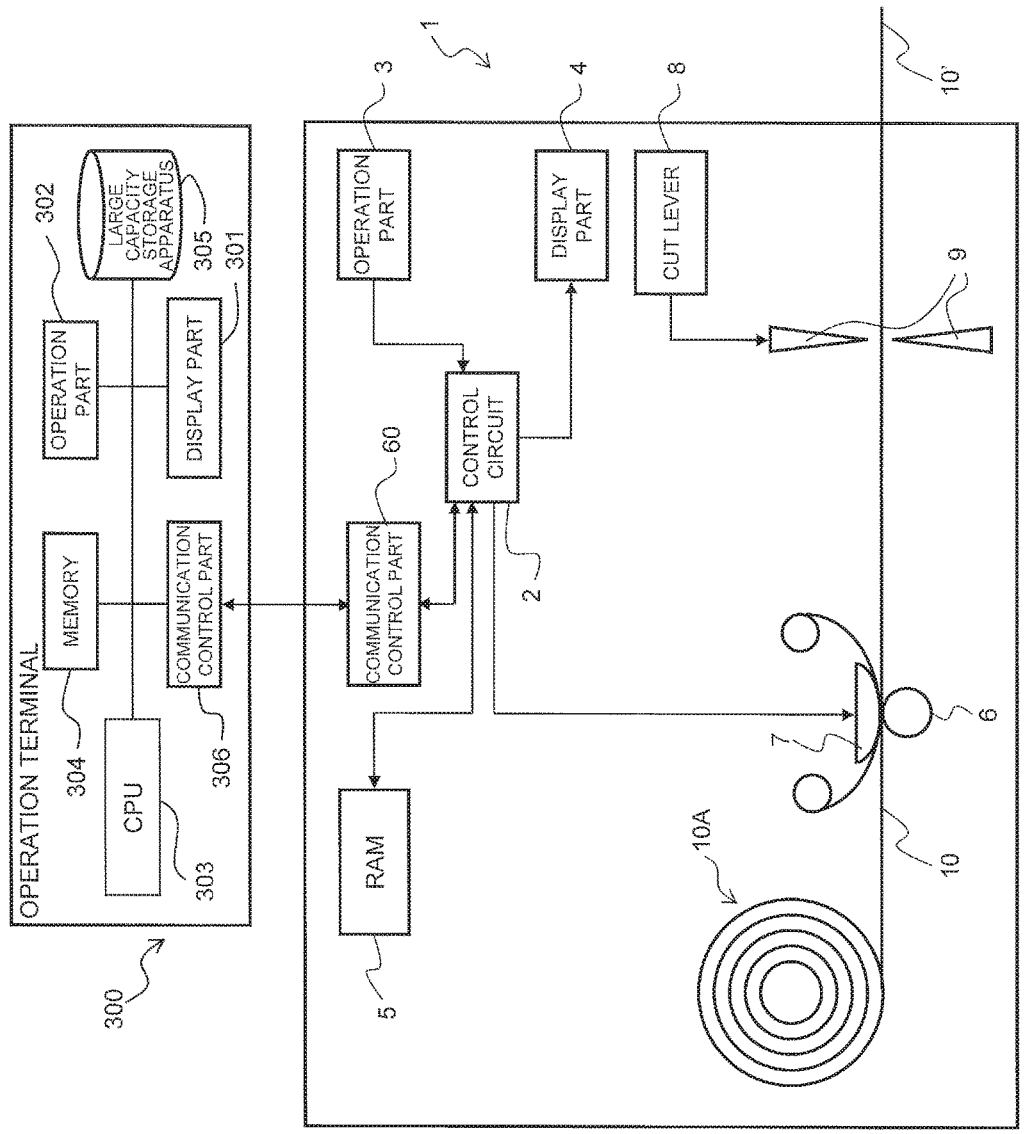
FIG. 1 is a functional block view showing a functional configuration of an operation terminal and a label producing apparatus according to a first embodiment of the present disclosure.

In FIG. 1, the label producing apparatus 1 includes a control circuit 2, an operating portion 3, a displaying portion 4, a RAM 5 having various types of information stored therein, a feeding roller 6, a printing head 7, a cutting lever 8, a cutter 9, and a communication control portion 60.

The label producing apparatus 1 is attached with a tape roll 10A having a print-receiving tape 10 wound thereon (that originally is a volute while that is shown being simplified as concentric circles). In this example, the print-receiving tape 10 is a what-is-called die-cut label tape having plural print-receiving parts disposed thereon along a tape feeding direction (the longitudinal direction thereof) (described later in detail).

The control circuit 2 includes a CPU and a ROM as a recording medium that are not shown. The control circuit 2 executes various types of program (including a program for a winding label production process of executing flows in FIG. 9, FIG. 24, and FIG. 25 described later) stored in advance in the ROM using a temporary storage function of the RAM 5, and controls the overall label producing apparatus 1.

The feeding roller 6 is disposed facing the printing head 7, and sandwiches the print-receiving tape 10 unwound from the tape roll 10A between the feeding roller 6 and the printing head 7 to hold the print-receiving tape 10 therebetween. The feeding roller 6 rotates and, as a result, feeds the print-receiving tape 10 feeding out the print-receiving tape 10 from the tape roll 10A.

The printing head 7 prints desired print objects such as characters, visual objects, and the like operationally input by a user (a user) on each of the print-receiving parts (whose details will be described later) of the print-receiving tape 10 fed by the feeding roller 6.

The cutter 9 is activated by operating the cutting lever 8 by the user and cuts a print-receiving tape 10' after the printing that has plural winding labels 100 disposed thereon along the feeding direction.

On the other hand, the operation terminal 300 includes a CPU 303, a memory 304 that include, for example, a RAM, a ROM, and the like, an operating portion 302, a displaying portion 301, a large capacity storage device 305 that includes a hard disc device and the like and that has various types of information stored therein, and a communication control portion 306 that controls transmission and reception of information with the communication control portion 60 of the label producing apparatus 1 through wireless communication.

The CPU 303 is configured to execute signal processing according to a program stored in advance in the ROM using the temporary storage function of the RAM and, as a result, to transmit and receive various types of instruction signal and information signal to/from the label producing apparatus 1. The programs stored in the ROM include the label production process program according to this embodiment to execute a print process method that includes steps of flows of FIG. 8, FIG. 19, and FIG. 22 described later.

<Outer Appearance of Print-Receiving Tape>

Figure 2A:
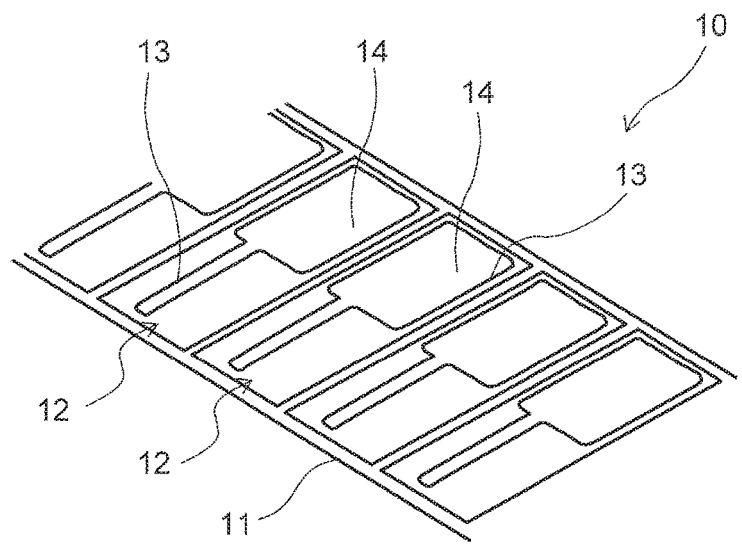
FIG. 2A is an explanatory view showing an outer appearance of a print-receiving tape before printing.
Figure 2B:
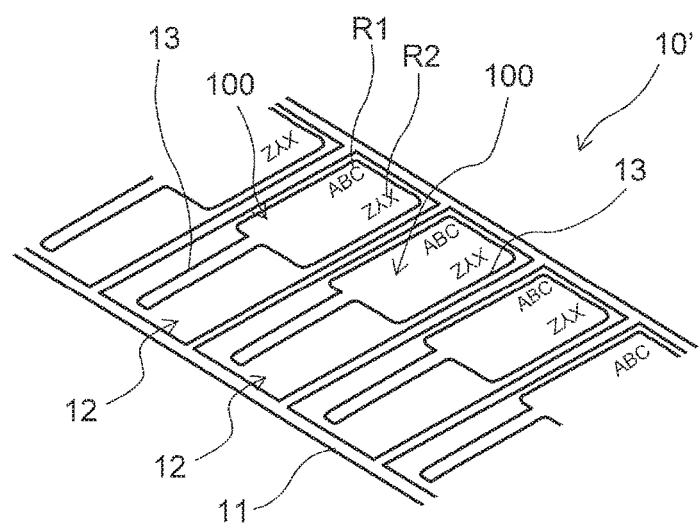
FIG. 2B is an explanatory view showing an outer appearance of the print-receiving tape after printing.

FIG. 2(a) and FIG. 2(b) respectively show outer appearances of the print-receiving tape 10 before the printing and the print-receiving tape 10' after the printing.

As shown in FIG. 2(a), the print-receiving tape 10 before the printing includes a detachable elongated separation material 11 and rectangular label mounts 12 disposed at predetermined small intervals along the longitudinal direction on the surface of one side (the upper side in FIG. 2(a)) of the separation material 11.

The label mounts 12 are each caused to detachably adhere to the separation material 11 by a proper adhesive layer disposed on the back face thereof. The label mounts 12 each include a label material 14 disposed capable of being cut off along a cutoff line 13.

As to the print-receiving tape 10' after the printing shown in FIG. 2(b), the printing head 7 prints a print R1 and a print R2 on the label material 14 (for example, a portion corresponding to a first print face 16a and a second print face 17a described later) of the print-receiving tape 10 having the above configuration and, as a result, a winding label 100 (a label) is produced. The winding label 100 can be separated from the separation material 11 by cutting off the winding label 100 from the label mount 12 along the cutoff line 13.

<Outer Appearance of Winding Label>

Figure 3A:
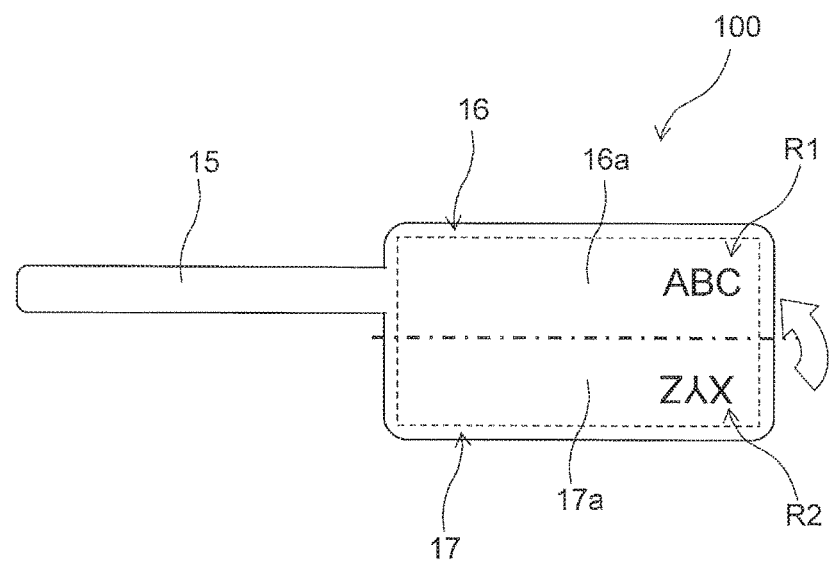
FIG. 3A is a plan view showing an outer appearance of a produced winding label.

As shown in FIG. 3(a), the winding label 100 produced as above includes an elongated rectangular winding part 15 that extends in the right-left direction as shown, a first label part 16 that is connected (in this example, integrally connected) in the right-left direction as shown from an end in the right-left direction (in this example, the right end) of the winding part 15 and that includes the first print face 16a having the print R1 printed thereon, and a second label part 17 that is connected to one side in the up-down direction as shown (in this example, the down side) from the first label part 16 and that includes the second print face 17a having the print R2 printed thereon. The first label part 16 and the second label part 17 have the same rectangular shape laterally elongated in the right-left direction.

As to the print R1, a character string "ABC" is printed upright in the right-left direction being justified at the right end opposite to the winding part 15 in the substantially central part in the up-down direction of the first print face 16a.

As to the print R2, a character string "XYZ" is printed rotated by 180° to be upside-down in the right-left direction being justified at the right end opposite to the winding part 15 in the substantially central part in the up-down direction of the second print face 17a.

Figure 3B:
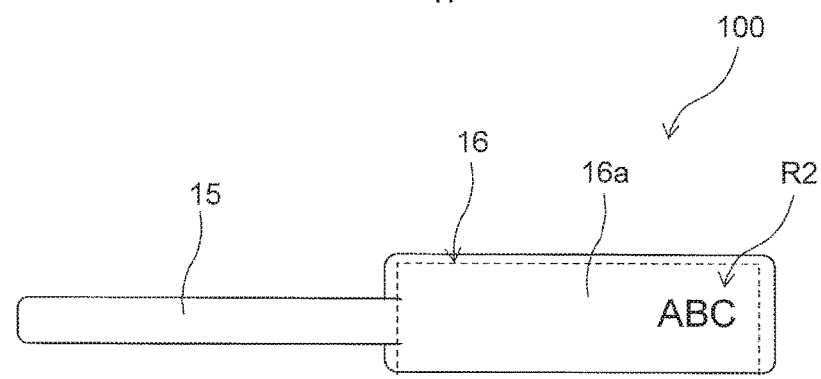
FIG. 3B is a plan view showing an outer appearance after a second label part is folded back toward a first label part.

When the winding label 100 having the above configuration is used, first, as shown in FIG. 3(b), the second label part 17 is folded back toward the first label part 16 in the form of a mountain fold (a mountain fold part is indicated by a dashed-dotted line in FIG. 3(a)) such that the print face 17a is exposed on the back face of the first label part 16 (see a white arrow) and the folded-back second label part 17 is affixed to the first label part 16 (by adhesive layers present on their back faces).

<Form of Use of Winding Label>

As shown in FIG. 4(a), thereafter, the winding label 100 folded back as shown in FIG. 3(b) is wound such that the substantially central part in the right-left direction of the winding part 15 is positioned on the circumference of a circular-pipe-like or a cable-like adherend 20 whose axis direction is the up-down direction as shown (in this example, "cable" and, hereinafter, as necessary, simply referred to as "cable 20"), and is folded back. An adhesive layer on the back face of the winding part 15 causes overlapping parts generated by the folding back of the winding part 15 to adhere to each other and also causes the part wound on the circumference of the cable 20 of the winding part 15 to adhere to the circumference of the cable 20.

By executing the above, the winding label 100 is attached to the cable 20, and the first label part 16 and the second label part 17 overlapping with each other protrude from the winding part 15 in the right-left direction as shown (a what-is-called P-shaped label). FIG. 4(a) shows an outer appearance of the winding label 100 attached to the cable 20, seen from the front side (the side of the first label part 16). As shown, as to the first label part 16, the character string "ABC" as the print R1 is written upright in the position form for the character string "ABC" to be justified at the end opposite to the winding part 15 (the tail end of the orientation of the character string "ABC") in the first label part 16.

FIG. 4(b) shows the winding label 100 attached to the cable 20, seen from the back side thereof (the side of the second label part 17). As shown, as to the second label part 17, the character string "XYZ" as the print R2 is written upright in the position form for the character string "XYZ" to be justified at the end opposite to the winding part 15 (a head end of the orientation of the character string "XYZ") in the second label part 17.

<Problem Specific to Winding of Winding Label>

As above, in this embodiment, the winding label 100 including the first label part 16, the second label part 17, and the winding part 15 is produced. When the winding label 100 is used, the winding part 15 is wound on the cable 20 being connected to the first label part 16 and the second label part 17. When the winding label 100 is used, how far the first label part 16 and the second label part 17 are spaced from the cable 20 can variously be considered in accordance with the use and the taste of the user. To realize the desired spacing distance, it is therefore convenient to have any guide function as to how the positions of the cable 20 and the winding part 15 are aligned with each other during the winding.

Features of this Embodiment

The gist of this embodiment is that, when the winding label 100 is produced (when the prints R1, R2 are formed by printing), an aim line to be a mark to achieve the guide function is simultaneously formed by printing. The details of this will sequentially be described below taking an example of the case that the winding label 100 including the prints R1, R2 is produced.

<Position Determination Approach for Aim Line>

In this embodiment, the label production process program is executed by the CPU 303 of the operation terminal 300 and, as a result, the position of the aim line M to be formed on the winding part 15 and to be a guidepost of the position for the winding on the cable 20 (see FIG. 5(c) described later) is determined.

As shown in FIG. 5(a), first, a proper operation through the operating portion 302 causes a proper edit screen for the winding label production process to be displayed on the displaying portion 301 of the operation terminal 300. This screen displays, for example, an image of the outer appearance of the winding label 100 having nothing printed in the first and the second label parts 16, 17. The user inputs and edits information to be printed on the first and the second label parts 16, 17 (in this example, the character strings "ABC" and "XYZ") through the operating portion 302 (FIG. 5(a) shows the state after the inputting).

Figure 6:
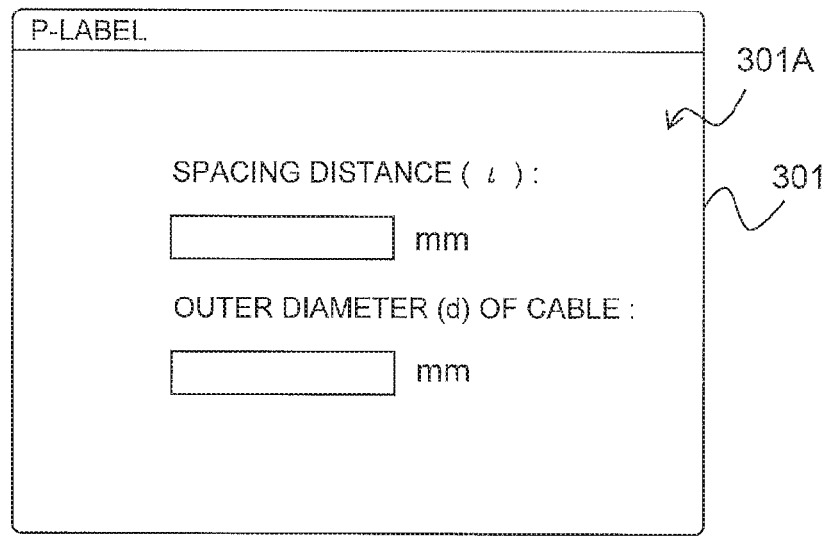
FIG. 6 is an explanatory view showing an instruction input screen displayed on a displaying portion of an operation terminal.

Thereafter, the spacing distance τ desired by the user is input by a proper operation through the operating portion 302 (FIG. 5(b)). An instruction input screen 301A displayed on the displaying portion 301 of the operation terminal 300 and to input the spacing distance (for example, a spacing distance along an extension direction in which the winding part 15 extends) t is shown in FIG. 6. The user inputs a desired value into a "spacing distance (t)" box shown and, as a result, can set the spacing distance τ [mm] from the cable 20 to the first label part 16 and the second label part 17 described above. In this example, τ that is τ=10 mm is set.

In this embodiment, a "outer diameter (d) of the cable" box to input the outer diameter of the cable 20 necessary for executing computing to determine the aim line M (whose details will be described later) is also disposed in the instruction input screen 301A. The user inputs the outer shape dimension of the cable 20 to which the user intends to attach the winding label 100 into this "outer diameter (d) of the cable" box. In this example, d that is d=5 mm is input.

Thereafter, the CPU 303 determines the position of the aim line M to be formed on the winding part 15 based on the input result of the spacing distance τ and the outer diameter d of the cable. For example, as shown in FIG. 5(c), when the overall length of the winding part 15 is set to be 50 mm, the position of the aim line M (relative to the position of the tip end of the winding part 15) is calculated according to Eq. (1) below according to which the length of the circumference of the outer diameter d [mm] of the cable and a twofold value of the spacing distance τ [mm] are subtracted from the overall length of 50 mm of the winding part 15, to be $$a = 50 - (d*3.14) - (t*2)$$
$$= 14.3 \qquad (1)$$

The position of the aim line M is determined to be a position spaced from the tip end of the winding part 15 toward the first and the second label parts 16, 17 by 14.3 mm. When the winding label 100 is produced (in other words, when the above "ABC" and "XYZ" are formed by printing on the first and the second label parts 16, 17), disposition by printing of the aim line M at the determined position is simultaneously executed. FIG. 5(c) shows an outer appearance of the winding label 100 having the aim line M formed on the surface of the winding part 15 in this manner.

<Approach of Winding on Cable Using Aim Line>

Figure 7A:
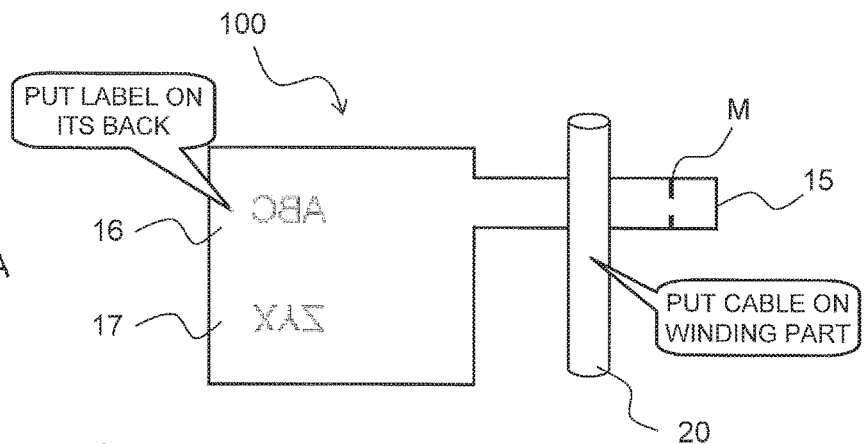
FIG. 7A is an explanatory view showing an approach of winding on the cable using the aim line.
Figure 7B:
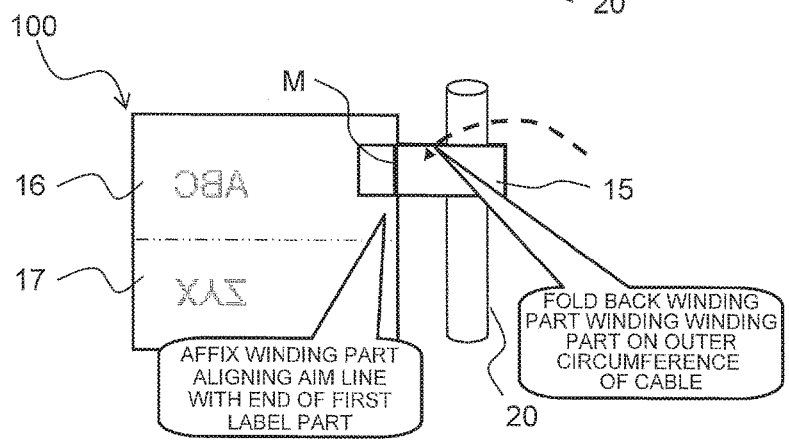
FIG. 7B is an explanatory view showing the approach of winding on the cable using the aim line.
Figure 7C:
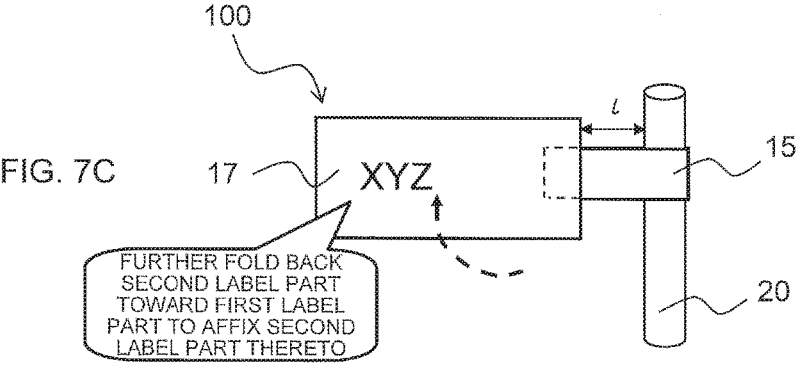
FIG. 7C is an explanatory view showing the approach of winding on the cable using the aim line.

An approach of actually winding the winding label 100 (including the aim line M) produced as above on the cable 20 is shown in FIG. 7(a) to FIG. 7(c).

As shown in FIG. 7(a), first, the winding label 100 is put on its back and the cable 20 is placed on the winding part 15. Though the aim line M and the characters "ABC" and "XYZ" are actually invisible because the winding label 100 is put on its back, the aim line M and the characters "ABC" and "XYZ" are respectively indicated by a dotted line and characters in a faint color in FIG. 7(a) to clearly show the positional relation therebetween.

Thereafter, as shown in FIG. 7(b), the winding part 15 is folded back being wound on the outer circumference of the cable 20 to affix the winding part 15 to the first label part 16 aligning the aim line M with the end of the first label part 16.

Thereafter, as shown in FIG. 7(c), the second label part 17 is folded back toward the first label part 16 to affix thereto. In this manner, the winding label 100 is attached in the state where the cable 20, and the first and the second label parts 16, 17 are spaced from each other by the desired spacing distance τ (in this example, τ=10 [mm]). The aim line M becomes externally invisible by being sandwiched between the two label parts 16, 17 by the affixation.

<Control Procedure Executed by Operation Terminal>

Figure 8:
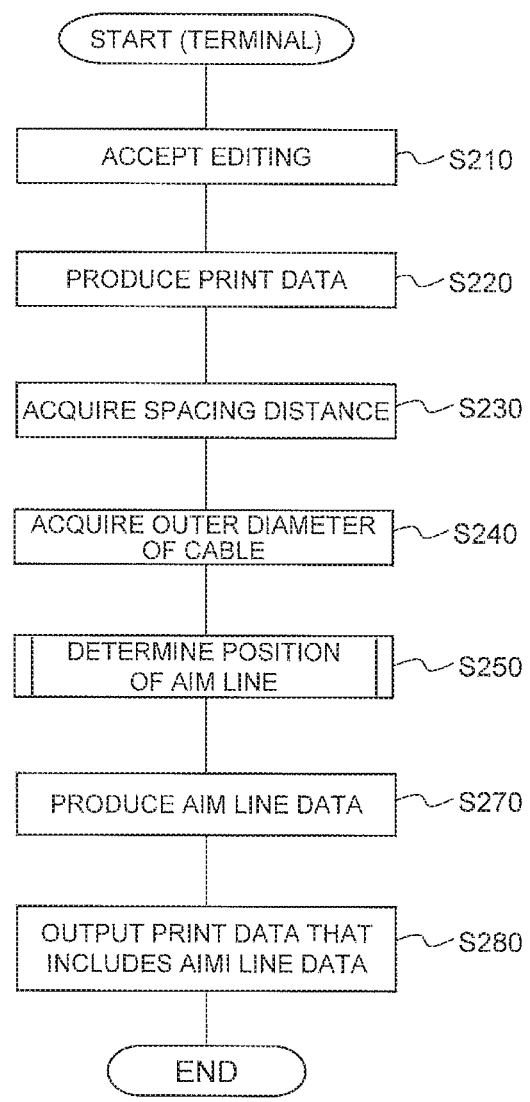
FIG. 8 is a flowchart showing a control procedure executed by a CPU of the operation terminal.

A flow representing a control procedure executed by the CPU 303 of the operation terminal 300 to realize the above approach is shown in FIG. 8. In FIG. 8, this flow is started being triggered by, for example, turning on of the power of the operation terminal 300.

At step S210, the CPU 303 outputs a control signal to the displaying portion 301 to cause the displaying portion 301 to display the edit screen thereon, and accepts an edit operation through the operating portion 302 for the first label part 16 and the second label part 17 included in the image of the outer appearance of the winding label 100 in the edit screen, (see FIG. 5(a)).

Thereafter, at step S220, the CPU 303 generates print data that corresponds to the result of the editing (in the above example, print data to form the print R1 of "ABC" and the print R2 of "XYZ").

At step S230, the CPU 303 outputs a control signal to the displaying portion 301 to cause the displaying portion 301 to display the instruction input screen 301A thereon, and acquires the spacing distance τ input by a proper operation on the operating portion 302 by the user in the state where the instruction input screen 301A is displayed.

Thereafter, the procedure advances to step S240 and the CPU 303 acquires the outer diameter d of the cable input by a proper operation on the operating portion 302 of the operation terminal 300 by the user in the state where the instruction input screen 301A is displayed.

At step S250, the CPU 303 determines the position of the aim line M using a predetermined calculation equation (in the above example, Eq. (1)) based on the spacing distance τ and the outer diameter d of the cable input at step 230 and step S240.

Thereafter, the procedure advances to step S270 and the CPU 303 generates aim line data to dispose the aim line M on the winding part 15 at the position of the aim line M calculated at step S250 (in the above example, at the position 14.3 mm away from the tip end of the winding part 15) (corresponding to the mark data) (see also FIG. 5(c)). The aim line M is not limited to this one having a straight line-like shape and an aim mark of any visual objects having a proper shape, achieving the function as a mark may be formed.

At step S280, the CPU 303 attaches the aim line data generated at step S270 to the print data generated at step S220 and transmits the print data to the label producing apparatus 1 through the communication control portion 306, and this flow comes to an end.

<Control Procedure Executed by Label Producing Apparatus>

Figure 9:
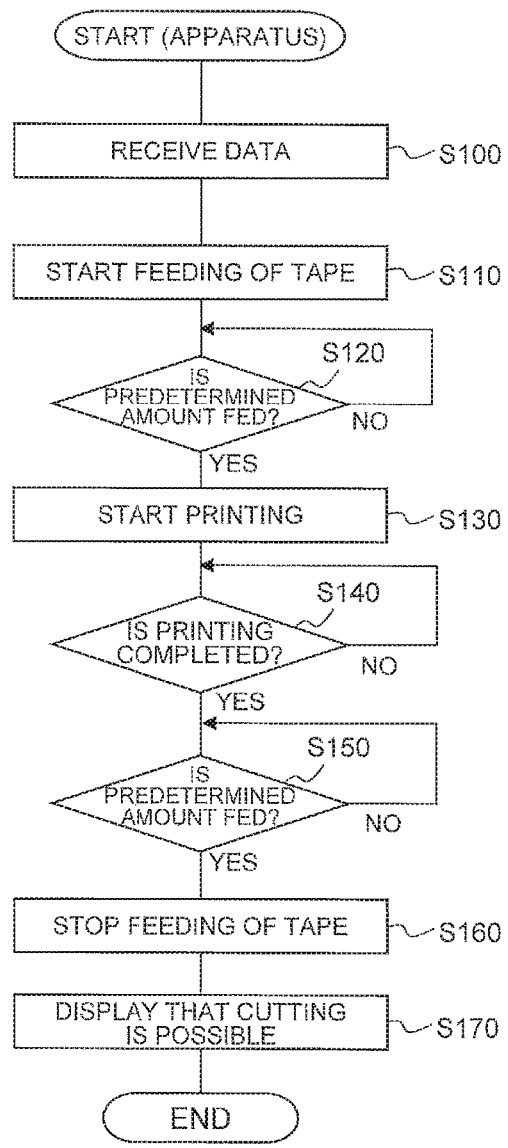
FIG. 9 is a flowchart showing a control procedure executed by a CPU of a control circuit of a winding label producing apparatus.

A control procedure executed by the control circuit 2 (for example, a CPU, and the same is applied hereinafter) of the label producing apparatus 1 corresponding to the flow of FIG. 8 will be described with reference to a flow of FIG. 9. In FIG. 9, this flow is started being triggered by, for example, turning on of the power of the label producing apparatus 1.

At step S100, the control circuit 2 first receives the print data (the print data to produce the winding label 100 including the aim line M) transmitted from the operation terminal 300 at step S280 of FIG. 8.

Thereafter, at step S110, the control circuit 2 outputs a control signal to the feeding roller 6 to cause feeding-out of the print-receiving tape 10 from the tape roll 10A, that is, feeding of the print-receiving tape 10 to start.

Thereafter, at step S120, the control circuit 2 determines whether the print-receiving tape 10 is fed by a predetermined amount. The "predetermined amount" is, for example, a feeding distance for the tip end of a print area not shown of the print-receiving tape 10 to reach the position at which the tip end substantially faces the printing head 7. The determination at step S120 is not satisfied until the print-receiving tape 10 is fed by the predetermined amount (S120: NO) and loop standing-by is executed. When the print-receiving tape 10 is fed by the predetermined amount, the determination at step S120 is satisfied (S120: YES) and the procedure advances to step S310.

At step S130, the control circuit 2 outputs a control signal to the printing head 7 to cause the printing head 7 to start disposition of the print based on the print data received at step S100 and for producing the winding label 100 including the aim line M, in the print area (for example, a part corresponding to the first print face 16a and the second print face 17a on the label material 14) of the print-receiving tape 10 fed by the feeding roller 6.

Thereafter, at step S140, the control circuit 2 determines whether all of the printing of the print data in the print area of the print-receiving tape 10 by the printing head 7 started at step S130 is completed. The determination at step S140 is not satisfied until all of the printing is completed (S140: NO) and loop standing-by is executed. When all of the printing is completed, the determination at step S140 is satisfied (S140: YES) and the procedure advances to step S150.

At step S150, the control circuit 2 determines whether the print-receiving tape 10 is further fed by the predetermined amount (for example, a feeding distance with which an upstream end of the winding label 100 in the feeding direction faces the cutter 9). The determination at step S150 is not satisfied until the print-receiving tape 10 is fed by the predetermined amount (S150: NO) and loop standing-by is executed. When the print-receiving tape 10 is fed by the predetermined amount, the determination at step S150 is satisfied (S150: YES) and the procedure returns to step S160.

At step S160, the control circuit 2 outputs a control signal to the feeding roller 6 to cause the feeding roller 6 to discontinue the feeding-out of the print-receiving tape 10 from the tape roll 10A, that is, the feeding of the print-receiving tape 10 started at step S110.

At step S170, the control circuit 2 outputs a control signal to the displaying portion 4 to cause the displaying portion 4 to display thereon display informing that the print-receiving tape 10' after the disposition of the print can be cut by operating the cutting lever 8. The process shown by the flow thereafter comes to an end. When the user operates the cutting lever 8 in response to the display, the cutter 9 is activated to cut off the print-receiving tape 10' after the printing. This cutting cuts off the print-receiving tape 10' having a proper length and, in the cut-off part, a desired number of winding label 100 (each including the aim line M) can be separated from the separation material 11 (even when no cutting by the cutter 9 is executed, the winding labels 100 can be separated).

Effects of First Embodiment

As above, in this embodiment, the label producing apparatus 1 produces the winding label 100 including the aim line M, that has the aim line M formed at the position determined according to the above approach (the position to be the guidepost for the position for winding on the cable 20). As a result, the user can easily and smoothly space the cable 20 and the first and the second label parts 16, 17 from each other by the desired spacing distance τ by winding the winding part 15 using the formed aim line M as the guide (see FIG. 7). As a result, the convenience can be improved.

In this embodiment, especially, the user inputs the desired spacing distance τ and the outer diameter d of the cable 20, as a result, the position of the corresponding aim line M is determined, and the aim line M is formed at this position. As a result, the desired spacing distance τ is reliably and highly precisely realized.

In this embodiment, especially, the position of the aim line M for affixation indicating the position for affixation of the winding part 15 to the first and the second label parts 16, 17 is determined and the aim line M is formed by printing at the position. As a result, the desired spacing distance τ can be easily and smoothly realized by affixing the tip end of the winding part 15 to the first and the second label parts 16, 17 such that the aim line M aligns with the predetermined positions of the first and the second label parts 16, 17 (in the above example, the edge of the first label part 16).

Second Embodiment

The second embodiment of the present disclosure will be described with reference to FIG. 10 and FIG. 11. This second embodiment is an embodiment for the case that two aim lines to align the position of the outer diameter of the cable 20 are formed by printing. Portions equivalent to those of the first embodiment will be given the same reference numerals and will not again be described or will be simply described when necessary.

<Position Determination Approach for Aim Lines>

In this embodiment, similarly to FIG. 5(a) of the first embodiment, when an edit screen shown in FIG. 10(a) is displayed, a user inputs and edits information to be printed on the first and the second label parts 16, 17 (in this example, the character strings "ABC" and "XYZ" same as above) through the operating portion 302.

Similarly to FIG. 5(b) of the first embodiment, as shown in FIG. 10(b), the user thereafter inputs the spacing distance τ (in this example, τ=10 [mm] similarly to the above) and the outer diameter d of a cable (in this example, d=5 [mm] similarly to the above).

Based on the result of the input, the CPU 303 thereafter determines the positions of the two aim lines M to be formed on the winding part 15. For example, as shown in FIG. 10(c) that corresponds to FIG. 5(c) of the first embodiment, when the overall length of the winding part 15 is set to be 50 mm, a winding starting position a1 to be the position of one aim line M of the two aim lines M (relative to the position of the tip end of the winding part 15) is calculated as $$a1 = 50 - \tau$$

$$= 40$$

and a winding ending position a2 to be the position of the other aim line M is calculated as $$a2 = a1 - (d*3.14)$$

$$= 24.3 \quad (2)$$

according to Eq. (2) to subtract the length of the circumference of the outer diameter d=5 [mm] of the cable from a1 that is a1=40 [mm] The positions of the two aim lines M are respectively determined as a position spaced by 40 mm and a position spaced by 24.3 mm from the tip end of the winding part 15 toward the first and the second label parts 16, 17. When the winding label 100 is produced (in other words, the above "ABC" and "XYZ" are formed by printing on the first and the second label parts 16, 17), disposition by printing of the aim lines M on their two determined positions is simultaneously executed. FIG. 10(c) shows the outer appearance of the winding label 100 that has the aim lines M formed in this manner on the surface of the winding part 15.

<Approach of Winding on Cable Using Aim Lines>

Figure 11A:
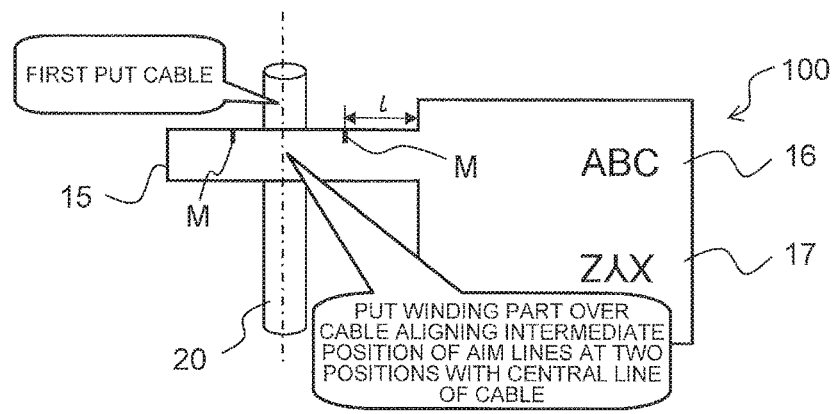
FIG. 11A is an explanatory view showing an approach of winding on the cable using the aim line.
Figure 11B:
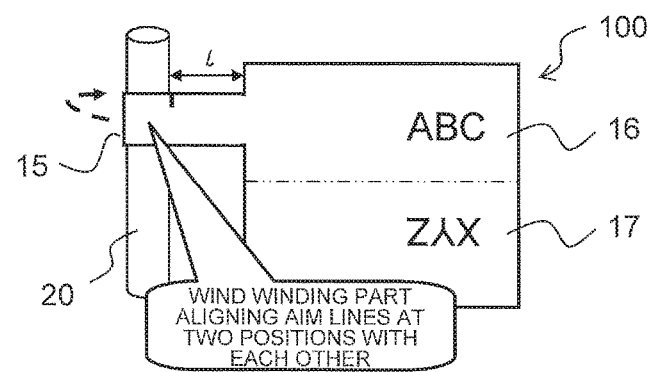
FIG. 11B is an explanatory view showing the approach of winding on the cable using the aim line.
Figure 11C:
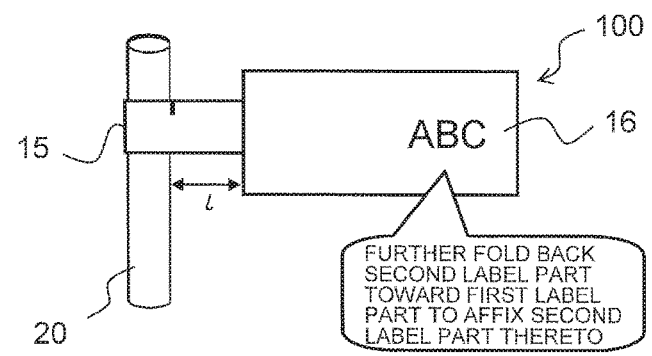
FIG. 11C is an explanatory view showing the approach of winding on the cable using the aim line.

An approach of actually winding the winding label 100 (including the two aim lines M) produced in this manner on a cable 20 is shown in FIG. 11(a) to FIG. 11(c).

As shown in FIG. 11(a), the winding part 15 is put over the cable 20 that is put in advance (such that the central line of the cable 20 aligns with the intermediate position of the aim lines M and M at the two positions).

As shown in FIG. 11(b), the winding part 15 is thereafter folded back being wound on the outer circumference of the cable 20 (aligning the aim lines at the two positions with the outer diameter of the cable) and the part before the folding back line and the part after the folding back line of the winding part 15 are affixed to each other.

Similarly to FIG. 7(c) of the first embodiment, as shown in FIG. 11(c), the second label part 17 is folded back toward the first label part 16 to affix the second label part 17 thereto. In this manner, the winding label 100 is attached in the state where the cable 20 and, the first and the second label parts 16, 17 are spaced from each other by the desired distance τ (in this example, τ=10 [mm]).

Effects of Second Embodiment

In this embodiment, similarly to the first embodiment, the user can also easily and smoothly space the cable 20, and the first and the second label parts 16, 17 from each other by the desired spacing distance τ by winding the winding part 15 using the two formed aim lines M and M as the guides. As a result, the convenience can be improved.

In this embodiment, especially, the user inputs the desired spacing distance τ and the outer diameter d of the cable, the positions of the corresponding two aim lines M (the two positions of the winding starting position a1 and the winding ending position a2) are determined, and the aim lines M are printed at the positions. As a result, the desired spacing distance τ is highly precisely realized. The alignment of the cable 20 and the winding part 15 with each other can further easily executed because both of the aim line M for the winding starting position a1 and the aim line M for the winding ending position a2 are formed being spaced from each other by the distance that corresponds to the length of the circumference of the outer diameter d of the cable.

Third Embodiment

The third embodiment of the present disclosure will be described with reference to FIG. 12 and FIG. 13. This third embodiment is an embodiment for the case that one aim line is formed by printing enabling omission of any input of the outer diameter of the cable. Portions equivalent to those of the first and the second embodiments will be given the same reference numerals and will not again be described or will be simply described when necessary.

<Position Determination Approach for Aim Line>

In this embodiment, similarly to FIG. 5(a) and FIG. 10(a) of the first and the second embodiments, when an edit screen shown in FIG. 12(a) is displayed, a user inputs and edits information to be printed on the first and the second label parts 16, 17 (in this example, the character strings "ABC" and "XYZ" same as above) through the operating portion 302.

Thereafter, different from the first and the second embodiments, as shown in FIG. 12(b), only the spacing distance τ (in this example, the spacing distance τ=10 [mm]) is input.

Based on the result of the input, the CPU 303 thereafter determines the position of the one aim line M to be formed on the winding part 15. For example, as shown in FIG. 12(c) that corresponds to FIG. 5(c), FIG. 10(c) as above, when the overall length of the winding part 15 is set to be 50 mm, a winding starting position a to be the position of the one aim line M (relative to the position of the tip end of the winding part 15) is calculated as $$a1 = 50 - \tau$$

$$= 40$$

by subtracting the spacing distance τ [mm] from the overall length of 50 mm of the winding part 15. The position of the one aim line M is determined at a position spaced from the tip end of the winding part 15 toward the first and the second label parts 16, 17 by 40 mm. When the winding label 100 is produced (in other words, when the above "ABC" and "XYZ" are formed by printing on the first and the second label parts 16, 17), the disposition by printing of the aim line M at the determined one position is simultaneously executed. FIG. 12(c) shows an outer appearance of the winding label 100 having the aim line M formed on the surface of the winding part 15 in this manner.

<Approach of Winding on Cable Using Aim Line>

Figure 13A:
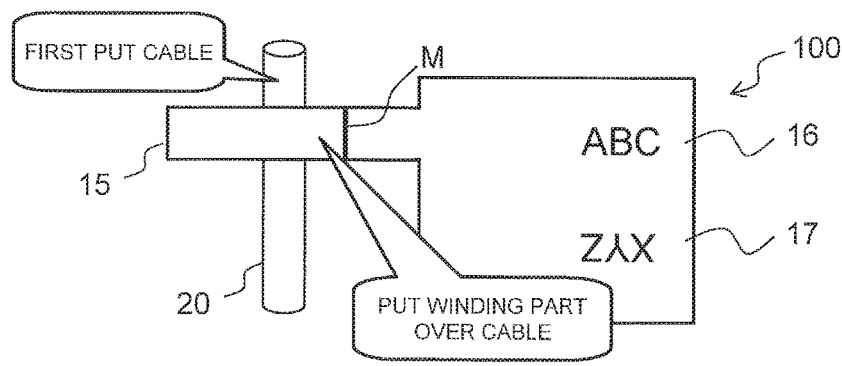
FIG. 13A is an explanatory view showing an approach of winding on the cable using an aim line.
Figure 13B:
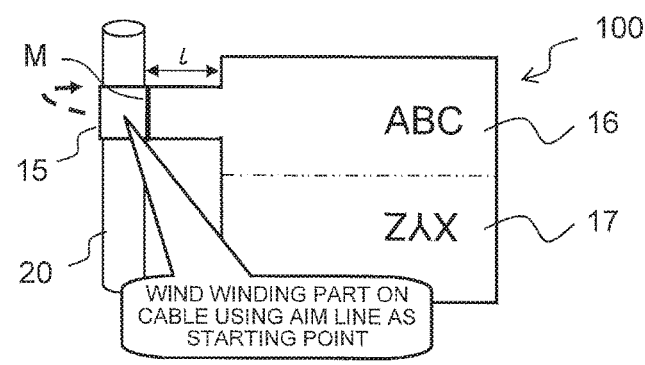
FIG. 13B is an explanatory view showing the approach of winding on the cable using the aim line.
Figure 13C:
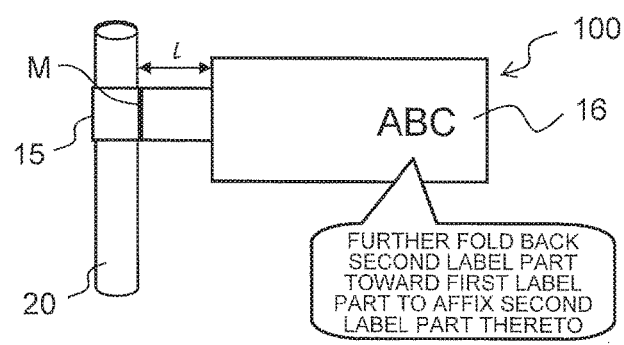
FIG. 13C is an explanatory view showing the approach of winding on the cable using the aim line.

An approach of actually winding the winding label 100 (including the one aim line M) produced as above on the cable 20 is shown in FIG. 13(a) to FIG. 13(c).

As shown in FIG. 13(a), first, the winding label part 15 is put over the cable 20 that is placed in advance (such that, for example, the aim line M is positioned close to the outer diameter on the side of the first and the second label parts 16, 17 of the cable 20).

Thereafter, as shown in FIG. 13(*b*), the winding part 15 is folded back being wound on the outer circumference of the cable 20 using the aim line M as the starting point (such that the spacing distance τ that is τ=10 [mm] is secured) and the part before the folding back line and the portion after the folding back line of the winding part 15 are affixed to each other.

Thereafter, similarly to FIG. 7(*c*) and FIG. 11(*c*), as shown in FIG. 13(*c*), the second label part 17 is folded back toward the first label part 16 to be affixed thereto. The winding label 100 is attached in the state where the cable 20, and the first and the second label parts 16, 17 are spaced from each other by the desired distance τ (in this example, τ=10 [mm].

Effects of Third Embodiment

In this embodiment, similarly to the first and the second embodiments, the user can also easily and smoothly space the cable 20, and the first and the second label parts 16, 17 from each other by the desired spacing distance τ by winding the winding part 15 as above using the one formed aim lines M as the guide. As a result, the convenience can be improved.

In this embodiment, especially, the user only inputs the desired spacing distance τ, as a result, the position of the one aim line M corresponding thereto (the winding starting position a) is determined, and the aim line M is formed at the position. As a result, the desired spacing distance τ can be highly precisely realized. The load of the operation can be reduced because the user does not need to input the outer diameter d of the cable.

Fourth Embodiment

The fourth embodiment of the present disclosure will be described with reference to FIG. 14 and FIG. 15. Similarly to the third embodiment, the fourth embodiment is an embodiment for the case that plural aim lines to be aligned with the position of the outer diameter of the cable 20 are formed by printing enabling omission of any input of the outer diameter of the cable. Portions equivalent to those of the first to the third embodiments will be given the same reference numerals and will not again be described or will be simply described when necessary.

<Position Determination Approach for Aim Lines>

In this embodiment, similarly to FIG. 5(*a*), FIG. 10(*a*), and the like, when an edit screen shown in FIG. 14(*a*) is displayed, the user inputs and edits information to be printed on the first and the second label parts 16, 17 (in this example, the character strings "ABC" and "XYZ" similarly to the above) through the operating portion 302.

Thereafter, similarly to FIG. 12(*b*) of the third embodiment, as shown in FIG. 14(*b*), only the spacing distance τ (in this example, τ=10 [mm] similarly to the above) is input.

Thereafter, based on the result of the input, the CPU 303 determines the positions of the two aim lines M to be formed on the winding part 15. For example, as shown in FIG. 14(*c*) that corresponds to FIG. 5(*c*), FIG. 10(*c*), and the like, when the overall length of the winding part 15 is set to be 50 mm, the winding starting position a1 to be the position of one aim line M to be formed most closely to the first and the second label parts 16, 17 of the plural aim lines M (relative to the position of the tip end of the winding part 15) is calculated as $$a1 = 50 - \tau$$
$$= 40$$

and the winding ending positions a2 to be the positions of the remaining plural aim lines M other than the one aim line M are calculated according to Eq. (3) below $$a2=a1-(d*3.14) \tag{3}$$

according to which the length of the circumference of the outer diameter d=5 [mm] of the cable is subtracted from the value of the position a1 that is a1=40 [mm].

In this case, the outer diameter d [mm] of the cable is properly substituted by plural values assumed and stored in advance (for example, d=3 [mm], 5 [mm], 7 [mm], 9 [mm], 11 [mm], 13 [mm], and the like). As a result, the distance from the tip end of the winding part 15 of the position of each of the plural aim lines M each corresponding to the position a2 is determined being increased little by little from the corresponding minimal value (in this example, 24.3 [mm]). When the winding label 100 is produced (in other words, when the above "ABC" and "XYZ" are formed by printing on the first and the second label parts 16, 17), disposition by printing of the aim lines M at the plural determined positions is simultaneously executed. FIG. 14(*c*) shows an outer appearance of the winding label 100 having the plural aim lines M formed on the surface of the winding part 15 in this manner.

<Approach of Winding on Cable Using Aim Lines>

An approach of actually winding the winding label 100 (including the plural aim lines M) produced as above on the cable 20 is shown in FIG. 15(*a*) to FIG. 15(*d*).

As shown in FIG. 15(*a*), first, the winding part 15 is put over the cable 20 that is put in advance (for example, positioning the aim line M that corresponds to the winding starting position a1 close to the outer diameter on the side of the first and the second label parts 16, 17 of the cable 20).

As shown in FIG. 15(*b*), the winding part 15 is thereafter wound on the outer circumference of the cable 20 aligning the winding part 15 with one of the aim lines M that is suitable for the dimension of the outer diameter of the cable 20 (for example, positioning the aim line M corresponding to the winding starting position a1 at the outer diameter on the side of the first and the second label parts 16, 17 of the cable 20 and positioning any one aim line M corresponding to the winding ending position a2 at the outer diameter on the opposite side of the first and the second label parts 16, 17 of the cable 20).

Thereafter, similarly to FIG. 7(*c*), FIG. 11(*c*), and the like, as shown in FIG. 15(*c*), the second label part 17 is folded back toward the first label part 16 to affix thereto. In this manner, the winding label 100 is attached in the state where the cable 20, and the first and the second label parts 16, 17 are spaced from each other by the desired distance τ (in this example, τ=10 [mm]) FIG. 15(*d*) shows the form of the winding of the winding part 15 on the cable 20 seen from the side of the second label part 17.

Effects of Fourth Embodiment

In this embodiment, similarly to the first to the third embodiments, the user can also easily and smoothly space the cable 20, and the first and the second label parts 16, 17 from each other by the desired spacing distance τ by winding the winding part 15 as above using the two of the plural formed aim lines M as the guides. As a result, the convenience can be improved.

In this embodiment, especially, the user only inputs the desired spacing distance τ, as a result, the position of the one aim line M indicating the winding starting position a1 and the positions of the plural aim lines M spaced from the above aim line M by the distances corresponding to the outer diameters d of the plural types of cable 20 assumed in advance (in other words, plural winding ending positions) are determined, and the aim lines M are printed at the determined positions. As a result, the desired spacing distance τ can be highly precisely realized. The load of the operation can be reduced because the user does not need to input the outer diameter d of the cable.

Fifth Embodiment

The fifth embodiment of the present disclosure will be described with reference to FIG. 16 and FIG. 17. The fifth embodiment is an embodiment for the case that plural aim lines to be aligned with the position of the outer diameter of the cable 20 are formed by printing enabling omission of both of any input of the spacing distance and any input of the outer diameter of the cable. Portions equivalent to those of the first to the fourth embodiments will be given the same reference numerals and will not again be described or will be simply described when necessary.

<Position Determination Approach of Aim Lines>

In this embodiment, similarly to FIG. 5(a), FIG. 10(a), and the like, when an edit screen shown in FIG. 16(a) is displayed, the user inputs and edits information to be printed on the first and the second label parts 16, 17 (in this example, the character strings "ABC" and "XYZ" similarly to the above) through the operating portion 302. Thereafter, any input of the spacing distance τ and any input of the outer diameter d of the cable are both unnecessary as above (FIG. 16(b)) and the CPU 303 calculates plural winding starting positions a to be the positions of the plural aim lines M, that correspond to plural spacing distances τ [mm] stored in advance. In this case, the plural winding starting positions "a" are determined to be arranged at an interval Δy from each other (FIG. 16(c)).

When the winding label 100 is produced (in other words, when the above "ABC" and "XYZ" are formed by printing on the first and the second label parts 16, 17), disposition by printing of the aim lines M at the plural determined positions is simultaneously executed. FIG. 16(c) shows an outer appearance of the winding label 100 having the plural aim lines M formed in this manner on the surface of the winding part 15.

<Approach of Winding on Cable Using Aim Lines>

An approach of actually winding the winding label 100 (including the plural aim lines M) produced as above on the cable 20 is shown in FIG. 17(a) to FIG. 17(d).

As shown in FIG. 17(a), first, the winding part 15 having the plural aim lines M formed thereon in advance is put over the cable 20 that is put in advance.

Thereafter, as shown in FIG. 17(b), the winding part 15 is wound on the outer circumference of the cable 20 using the aim line M that corresponds to the spacing distance τ [mm] desired to be set of the plural aim lines M, as the starting point.

Thereafter, similarly to FIG. 7(c) and FIG. 11(c), and the like, as shown in FIG. 17(c), the second label part 17 is folded back toward the first label part 16 to be affixed thereto. The winding label 100 is attached in the state where the cable 20, and the first and the second label parts 16, 17 are spaced from each other by the desired distance (in this example, τ=10 [mm]) FIG. 17(d) shows the form of the winding of the winding part 15 on the cable 20 seen from the side of the second label part 17.

Effects of Fifth Embodiment

In this embodiment, similarly to the first to the fourth embodiments, the user can also easily and smoothly space the cable 20, and the first and the second label parts 16, 17 from each other by the desired spacing distance τ by winding the winding part 15 as above using the one of the plural formed aim lines M as the guide. As a result, the convenience can be improved.

In this embodiment, especially, as above, the plural spacing distances τ are assumed in advance, the winding starting positions a corresponding to the spacing distances τ are determined, and the aim line M is printed at each of the determined positions. As a result, the user can realize the desired spacing distance τ in the form of selection from the assumed spacing distances t. In this case, the user does not need to input the outer diameter d of the cable and the spacing distance τ themselves and the load of the operation can significantly be reduced.

Sixth Embodiment

In this embodiment, when the flow of FIG. 8 is executed by the operation terminal 300 during the production of the winding label 100, in the determination process for the position of the aim line M at step S250, any one of the approaches of the first to the fifth embodiments is automatically selected and is executed. In this case, as shown in an instruction input screen 301B displayed on the displaying portion 301 shown in FIG. 18 that corresponds to FIG. 6, a check box for "reduce printing of aim lines" is disposed in addition to the "spacing distance (t)" box and an "outer diameter (d) of the cable" box, and the above selection is executed in accordance with presence or absence of any check in each of these three boxes.

Figure 19:
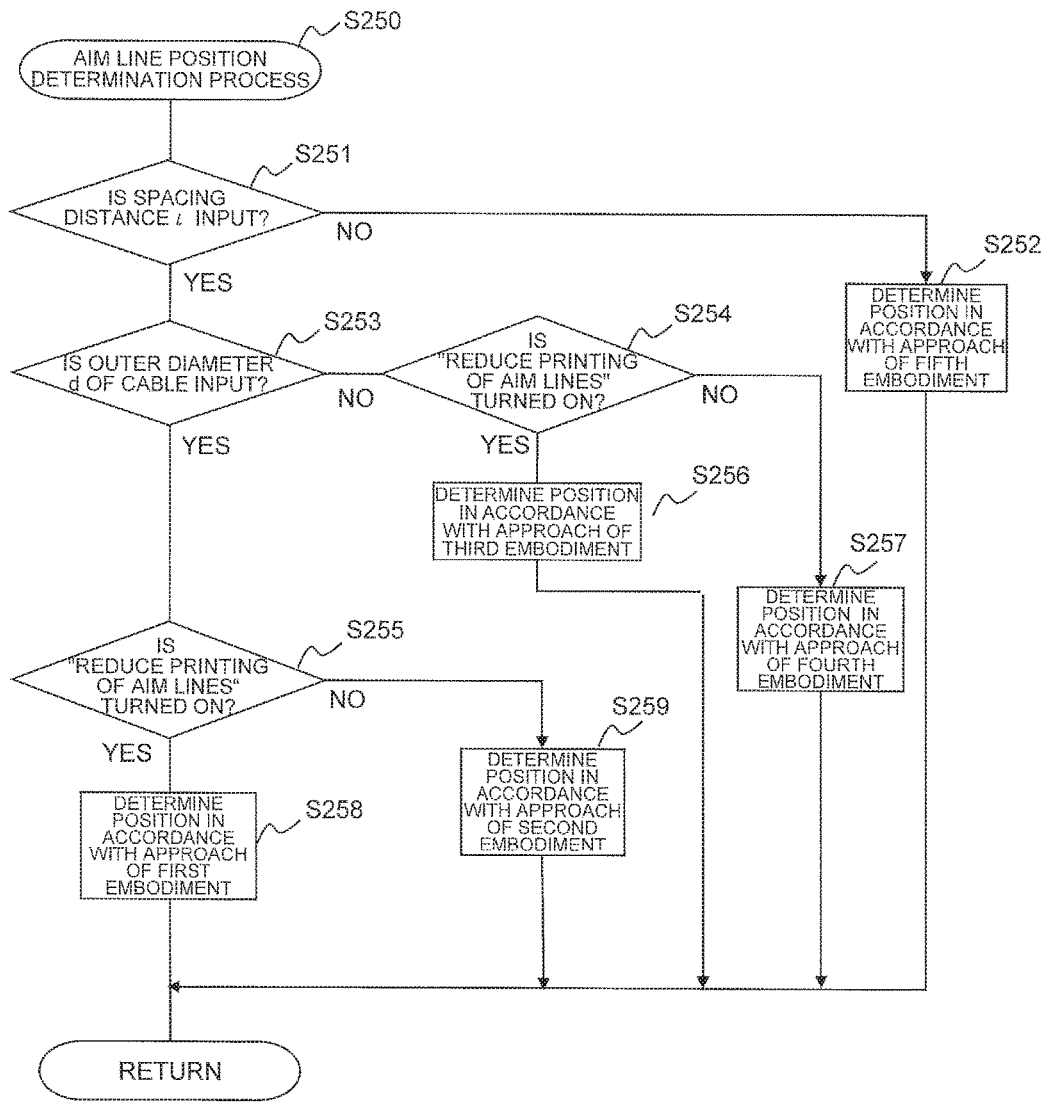
FIG. 19 is a flowchart showing a detailed procedure executed at step S250.

A detailed procedure of step S250 executed by the CPU 303, that is the gist of this embodiment is shown in FIG. 19.

At step S251, when the instruction input screen 301B of FIG. 18 is displayed at step S230 instead of the instruction input screen 301A of FIG. 6, first, the CPU 303 determines whether any input is executed for the "spacing distance (t)" box. When the spacing distance (t) is not input, the determination at step S251 is not satisfied (S251: NO) and the procedure advances to step S252. When the spacing distance (t) [mm] is input, the determination at step S251 is satisfied (S251: YES) and the procedure advances to step S253 described later.

At step S252, the CPU 303 determines the position of the aim line M using the approach of the fifth embodiment (see FIG. 16 and FIG. 17). The CPU 303 determines the positions of the plural aim lines M corresponding to the plural spacing distances τ [mm] assumed and stored in advance. Thereafter, the procedure returns to step S270 in the flow of FIG. 8.

On the other hand, at step S253, the CPU 303 determines whether any input is executed for the "outer diameter (d) of the cable" box in the instruction input screen 301B. When the outer diameter d of the cable (corresponding to the dimension of the outer shape of the adherend) is not input, the determination at step S253 is not satisfied (S253: NO)

and the procedure advances to step S254. When the outer diameter d [mm] of the cable is input, the determination at step S253 is satisfied (S253: YES) and the procedure advances to step S255 described later.

At step S254, the CPU 303 determines whether any check is put in the "reduce printing of aim lines" check box in the instruction input screen 301B. When a check is put therein, the determination at step S254 is satisfied (S254: YES) and the procedure advances to step S256. When no check is put therein, the determination at step S254 is not satisfied (S254: NO) and the procedure advances to step S257 described later.

At step S256, the CPU 303 determines the position of the aim line M using the approach of the above third embodiment (see FIG. 12 and FIG. 13). The CPU 303 determines the position of the one aim line M that corresponds to the value of the spacing distance τ input in the "spacing distance (t)" box. The procedure thereafter returns to step S270 in the flow of FIG. 8.

On the other hand, at step S257, the CPU 303 determines the positions of the aim lines M using the approach of the above fourth embodiment (see FIG. 14 and FIG. 15). The CPU 303 determines the positions (corresponding to the winding starting position a1 and the winding ending position a2) of the two aim lines M that corresponds to the values of the spacing distances τ input in the "spacing distance (t)" box. The procedure thereafter returns to step S270 in the flow of FIG. 8.

At step S255 that is advanced to because the determination at step S253 is not satisfied, similarly to step S254, the CPU 303 determines whether any check is put in the "reduce printing of aim lines" check box. When a check is put therein, the determination at step S255 is satisfied (S255: YES) and the procedure advances to step S258. When no check is put therein, the determination at step S255 is not satisfied (S255: NO) and the procedure advances to step S259 described later.

At step S258, the CPU 303 determines the position of the aim line M using the approach of the first embodiment (see FIG. 5 and FIG. 7). The CPU 303 determines the position of the one aim line M that is calculated using Eq. (1) based on the value of the spacing distance τ input in the "spacing distance (t)" box and the value of the outer diameter d of the cable input in the "outer diameter (d) of the cable" box. Thereafter, the procedure returns to step S270 in the flow of FIG. 8.

On the other hand, at step S259, the CPU 303 determines the positions of the aim lines M using the approach of the second embodiment (see FIG. 10 and FIG. 11). The CPU 303 determines the positions of the two aim lines M that are calculated using Eq. (3) and the like based on the value of the spacing distance τ input in the "spacing distance (t)" box and the value of the outer diameter d of the cable input in the "outer diameter (d) of the cable" box. Thereafter, the procedure returns to step S270 in the flow of FIG. 8.

Effects of Sixth Embodiment

In this embodiment, plural printing modes set in advance (printing modes corresponding to the position determination approaches of the first to the fifth embodiments) can automatically be switched thereamong in accordance with the values input and set by the user and the aim line(s) M corresponding to each of the printing modes can be formed on the winding part 15.

Seventh Embodiment

In this embodiment, when plural winding labels 100 are produced using the spacing distance τ [mm] acquired as above (the procedure for accepting the number of winding labels 100 to be produced is provided at step S210 or at a proper point other than step S210 of the flow of FIG. 8), all the winding labels 100 are not produced using the acquired spacing distance τ but are produced causing the spacing distances to differ from each other little by little.

<Background>

Figure 20A:
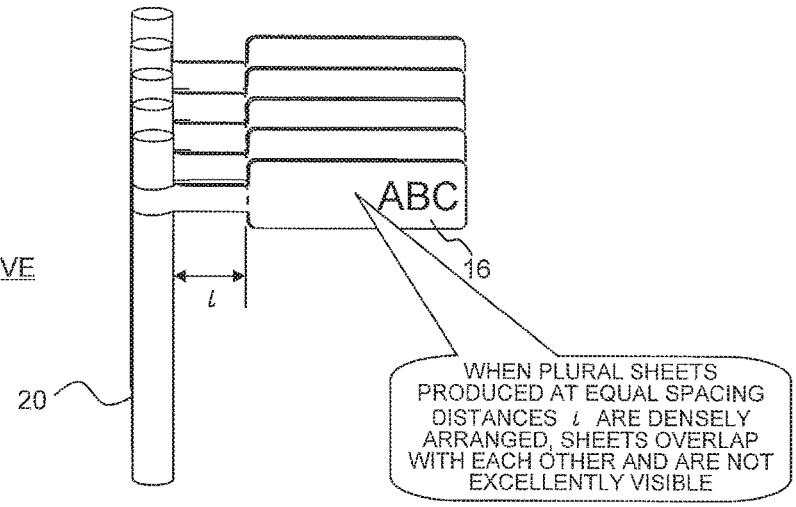
FIG. 20A is an explanatory view showing Comparative Example for a seventh embodiment of the present disclosure.

In the case that all the plural winding labels 100 are produced using the same one spacing distance τ as above, as shown in a Comparative Example of FIG. 20(a), the labels may overlap with each other and the content of the printing thereof may be difficult to be seen when the plural winding labels 100 and the cables 20 are densely arranged supposedly.

Figure 20B:
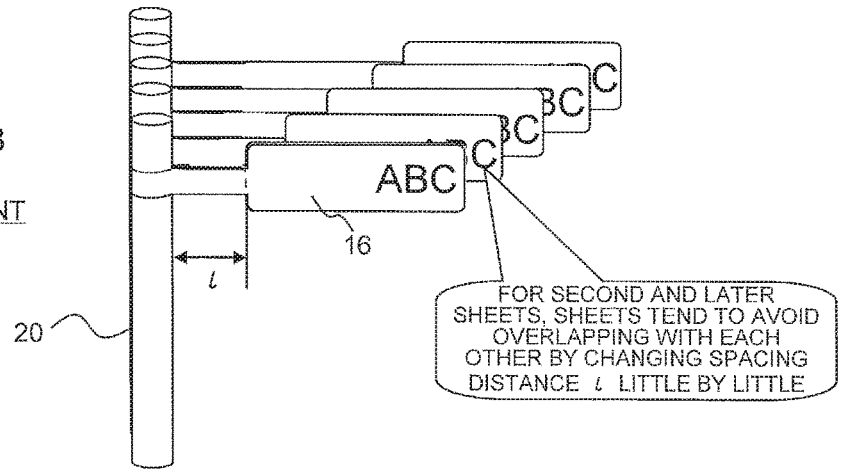
FIG. 20B is an explanatory view showing a setting approach for a spacing distance according to the seventh embodiment of the present disclosure.

In this embodiment, as in FIG. 20(b), the positions of the first label parts 16 (or the second label parts 17) can be shifted from each other little by little by serially adding a predetermined shift amount (an interval) Δx to the above τ for the second and the subsequent winding labels 100 relative to the spacing distances τ, and the content of the printing can be made easily seen as much as possible.

Figure 21:
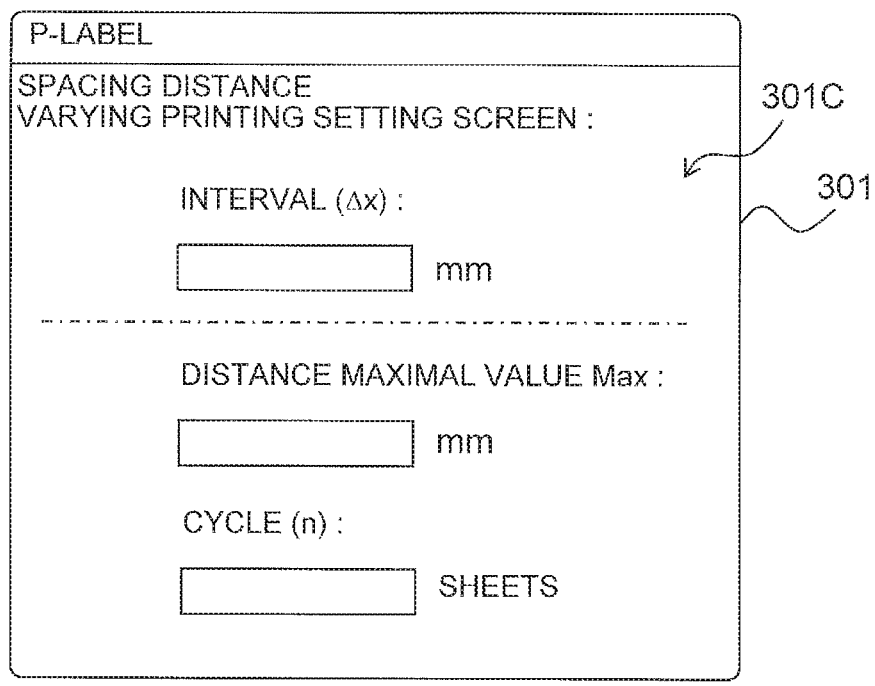
FIG. 21 is an explanatory view showing a variation print screen for the spacing distance displayed on the displaying portion of the operation terminal.

To realize the above approach, in this embodiment, a varying printing setting screen 301C for the spacing distances τ as shown in FIG. 21 is displayed on the displaying portion 301 of the operation terminal 300. In this screen, an "interval (Δx)" box to input therein the shift amount (the interval) is disposed. In addition to this, a "distance maximal value MAX" box to define the distance maximal value (whose details will be described later) in varying the value of the spacing distances τ by serially adding the interval Δ and a "cycle (n)" box to define the cycle (whose details will be described later) in varying the value of the spacing distances τ by serially adding the interval Δ thereto are disposed therein.

In this embodiment, a procedure for "spacing distance varying setting process" at step S260 is newly provided between step S250 and step S270 in the flow of FIG. 8 executed by the CPU 303 of the operation terminal 300. The detailed content of step S260 to be the gist of this embodiment is shown in FIG. 22.

Figure 22:
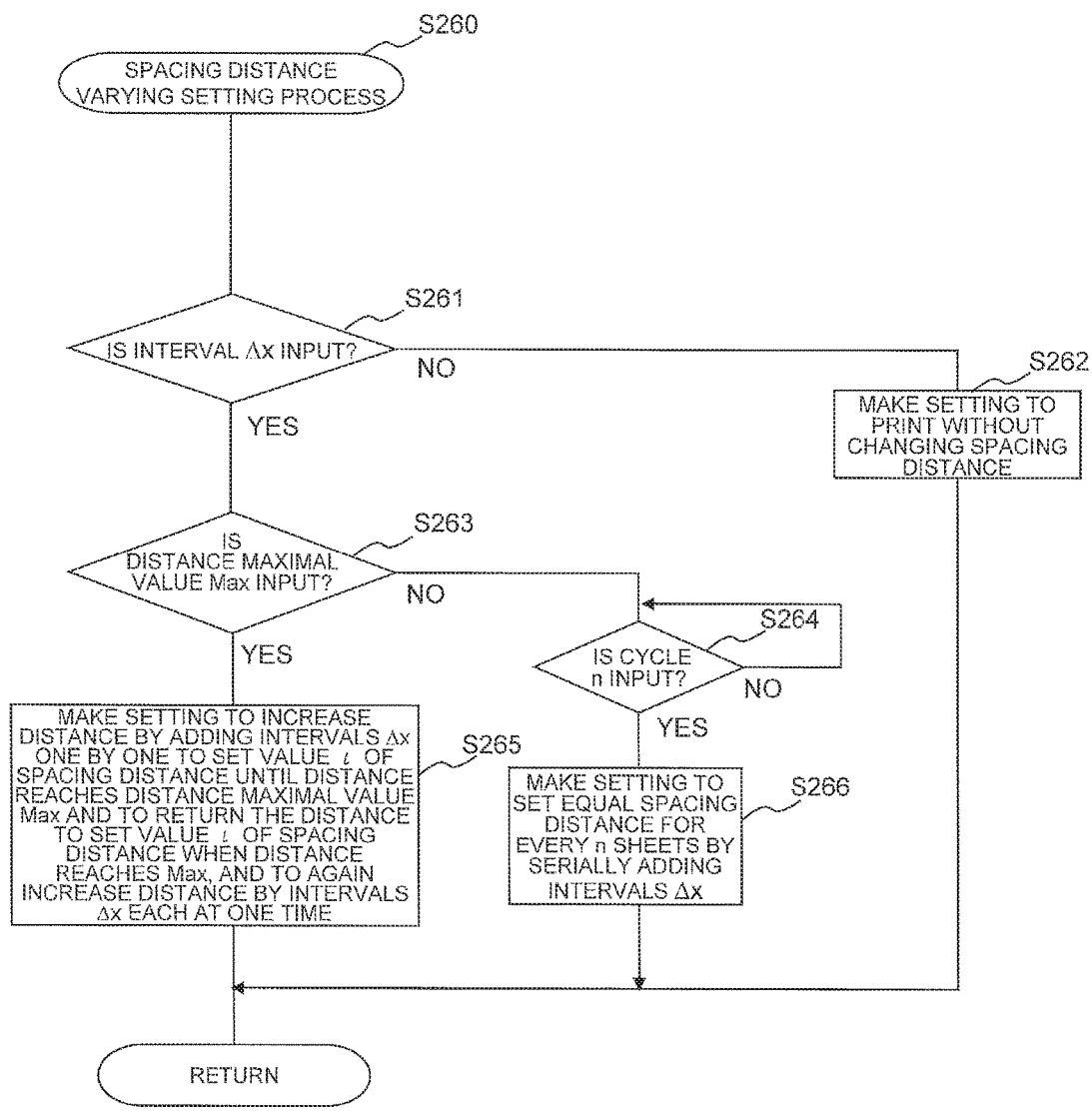
FIG. 22 is a flowchart showing a procedure for a spacing distance variation setting process executed by the CPU of the operation terminal.

In FIG. 22, at step S261, the CPU 303 first determines whether any value of the shift amount is input in the "interval (Δx)" box in the spacing distance varying printing setting screen 301C on the displaying portion 301 by a proper operation through the operating portion 302. When the shift amount is not input therein, the determination at step S261 is not satisfied (S261: NO) and the procedure advances to step S262. When a shift amount is input therein, the determination at step S261 is satisfied (S261: YES) and the procedure advances to step S263.

At step S262, the CPU 303 makes a setting to print the winding label 100 without executing the approach of serially changing the spacing distance τ as in FIG. 20(b), and the procedure advances to step S270 in the flow of FIG. 8.

On the other hand, at step S263, the CPU 303 determines whether a value of the distance maximal value is input in the "distance maximal value MAX" box in the spacing distance varying printing setting screen 301C by a proper operation through the operating portion 302. When the distance maximal value Max is input therein, the determination at step S263 is satisfied (S263: YES) and the procedure advances to step S265. When the distance maximal value Max is not input therein, the determination at step S263 is not satisfied (S263: NO) and the procedure advances to step S264 described later.

At step S265, the CPU 303 makes a setting to increase the value of the spacing distance by serially adding the shift amount Δx set at step S261 to the value (a set value) of the spacing distance τ acquired at step S230 of FIG. 8 until the value reaches the value of the maximal value Max set at step S263 and, when the value reaches the maximal value Max, the CPU 303 makes a setting to cause the value to return to the set value of the acquired spacing distance τ and again serially increase the spacing distance similarly to the above. For example, when the number of winding label to be produced is 10, the set value of the spacing distance τ is 15 mm, the interval is 1 mm, and the maximal value Max is 22 mm, the spacing distance of the winding label 100 to be actually printed is set to be 15 mm for the first label and, as a result, at step S250, the position of the aim line M corresponding to this setting is determined. For the seven subsequent labels, the spacing distances are set to serially be increased like 16 mm→17 mm→18 mm→19 mm→20 mm→21 mm→22 mm and, as a result, at step S250, the positions of the aim lines M corresponding to this setting are determined. Thereafter, the spacing distances are again set being serially increased in order of 15 mm→16 mm→ . . . . When step S265 comes to an end, the procedure advances to step S270 in the flow of FIG. 8.

On the other hand, at step S264, the CPU 303 determines whether any value of the cycle is input in the "cycle (n)" box in the spacing distance varying printing setting screen 301C by a proper operation through the operating portion 302. When the cycle is not input therein, the determination at step S264 is not satisfied (S264: NO) and loop standing-by is executed until this determination is satisfied. When the cycle is input therein, the determination at step S264 is satisfied (S264: YES) and the procedure advances to step S266.

At step S266, the CPU 303 makes a setting to acquire the same spacing distance τ for every cycle n [sheet] serially adding the shift amount Δx set at step S261. For example, when the number of winding label to be produced is 10, the set value of the spacing distance τ is 15 mm, the interval is 1 mm, and the cycle is 5 sheets, the spacing distance of the winding labels 100 to be actually printed is set to be 15 mm for the first label and, at step S250, as a result, the positions of the aim lines M corresponding to this setting are determined. For the four subsequent labels, the spacing distances are set to serially be increased like 16 mm→17 mm→18 mm→19 mm and, as a result, at step S250, the positions of the aim lines M corresponding to this setting are determined. Thereafter, for every five sheets, similarly to the above, the spacing distances are set to be increased in order of 15 mm→16 mm→17 mm→18 mm→19 mm. When step S266 comes to an end, the procedure advances to step S270 in the flow of FIG. 8.

In the above, the description has been made taking the example of the case that the spacing distance is increased little by little from the original spacing distance τ using the predetermined shift amount Δx (when the spacing distance reaches the distance maximal value Max, the spacing distance is again increased from the original spacing distance τ, or an increase by adding the shift amount Δx for every cycle n sheets is repeated) while the spacing distance is not limited to this. On the contrary, an approach according to which the spacing distance is again reduced from the original spacing distance τ when the spacing distance reaches the distance minimal value MM, or reduction by reducing the shift amount Δx for every cycle n sheets is repeated may be employed. In this case, the same effects as above can also be achieved.

Effects of Seventh Embodiment

In this embodiment, when the plural winding labels 100 are produced, for each of the winding labels 100, the spacing distances τ each from the cable 20 to the first and the second label parts 16, 17 can be shifted from each other little by little. As a result, as shown in FIG. 20(b), for example, when the plural cables 20 are densely arranged and the winding label 100 is wound on each of the plural cables 20, the tendency for the first and the second label parts 16, 17 to be invisible (see FIG. 20(a)) due to the full overlapping of the winding labels 100 with each other can be suppressed.

The present disclosure is not limited to the above embodiments, and various modifications can be made thereto within a scope not departing from the purport and the technical idea thereof. The modification examples will sequentially be described below. Portions equivalent to those of the embodiments will be given the same reference numerals and will not again be described or will be simply described when necessary.

Figure 23:
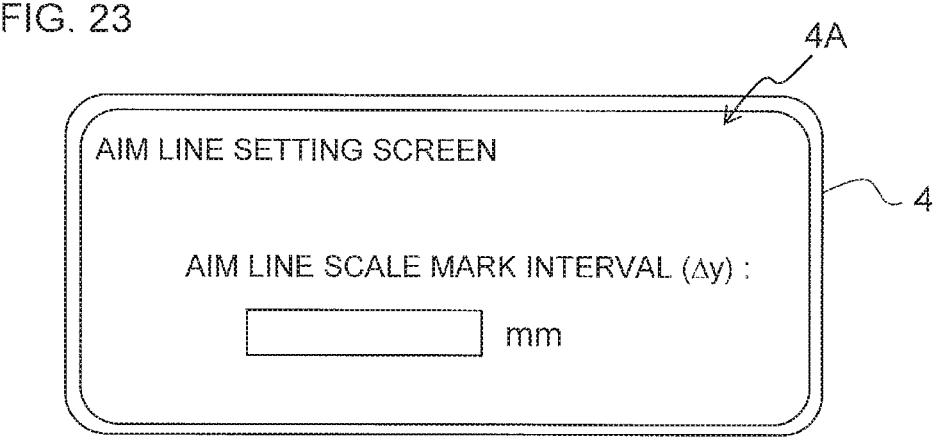
FIG. 23 is an explanatory view showing an aim line setting screen displayed on the displaying portion in a modification example applied to a standalone label producing apparatus.

(1) Case where Present Disclosure is Applied to Standalone Label Producing Apparatus The approach of the fifth embodiment can also be applied to the label producing apparatus 1 of a what-is-called standalone type that can operate on its own. In this embodiment, as shown in FIG. 23, an aim line setting screen 4A is displayed on the displaying portion 4 by a proper operation of the operating portion 3 of the label producing apparatus 1. In this screen 4A, an "aim line scale mark interval Δy" box with which the interval Δy shown in FIG. 16(c) and FIG. 17(a) in the fifth embodiment can manually be set is disposed. In this modification example, the plural aim lines M can be formed by printing on the winding part 15 at the intervals Δy (except an exception described later) by inputting a proper numerical value in the "aim line scale mark interval Δy" box by properly operating the operating portion 3.

To realize the above approach, a control procedure executed by the control circuit 2 of the label producing apparatus 1 of this modification example will be described with reference to a flow of FIG. 24 that corresponds to FIG. 9. In the flow shown in FIG. 24, step S102, step S103, and step S105 are newly provided instead of step S100 of FIG. 9.

Figure 24:
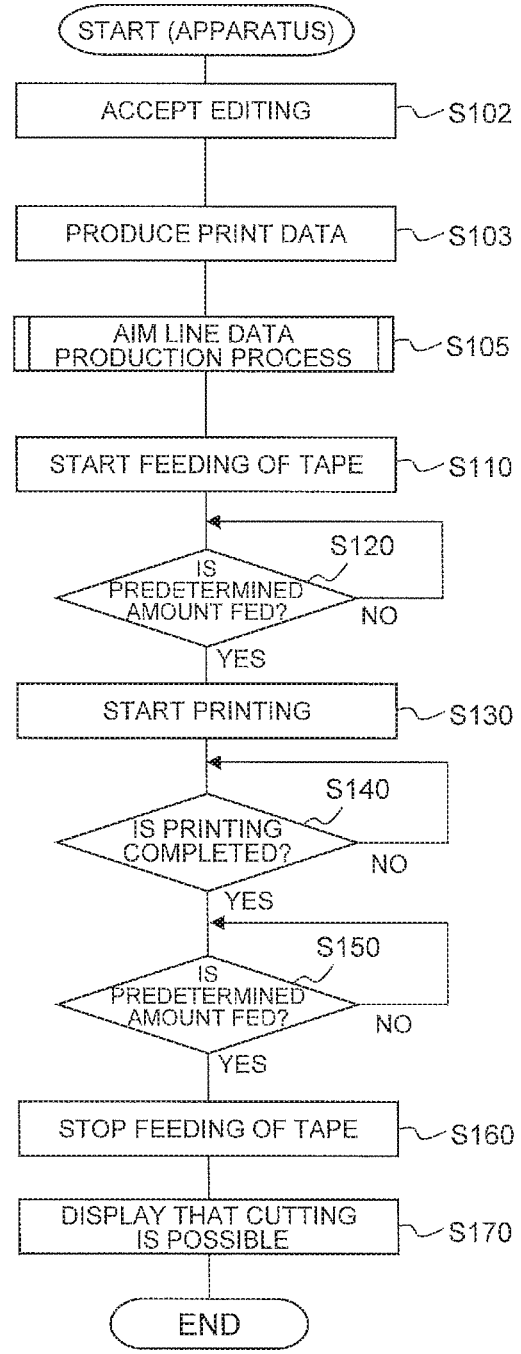
FIG. 24 is a flowchart showing a control procedure executed by the CPU of the control circuit in the label producing apparatus.

In FIG. 24, similarly to step S210 of FIG. 8 executed by the CPU 303 of the operation terminal 300, at step S102, the control circuit 2 first accepts an edit operation for a printing content to be printed on the first label part 16 and the second label part 17 of the winding label 100 through the operating portion 3 of the label producing apparatus 1.

Thereafter, the procedure advances to step S103 and, similarly to step S220 of FIG. 8, the control circuit 2 generates the print data that corresponds to the result of the editing. The procedure thereafter advances to the procedure for the aim line data generation process at step S105.

Figure 25:
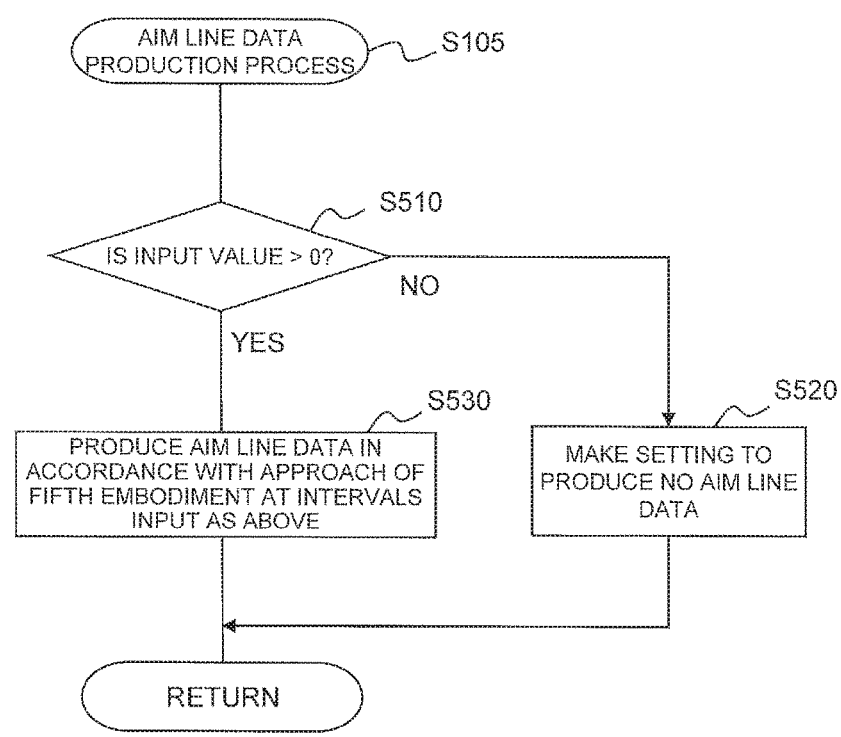
FIG. 25 is a flowchart showing a detailed procedure executed at step S105.

The detailed procedure for step S105 is shown in FIG. 25. In FIG. 25, at step S510, the control circuit 2 first determines whether an input value (an aim line scale mark interval) Δy in the "aim line scale mark interval Δy" box in the aim line setting screen 4A is greater than a predetermined threshold value (in this example, zero) (in other words, is a positive value). When Δy is Δy=0, the determination at step S510 is not satisfied (S510: NO) and the procedure advances to step S520. When Δy is Δy>0, the determination at step S510 is satisfied (S510: YES) and the procedure advances to step S530 described later.

At step S520, the control circuit 2 ignores the input value in the "aim line scale mark interval Δy" box, does not determine any position of the aim line M, and does not generate any corresponding aim line data. Thereafter, the procedure advances to step S110 of FIG. 24.

On the other hand, at step S530, the control circuit 2 generates the aim line data for plural aim lines based on the input value Δy according to the approach of the fifth embodiment (see FIG. 17). Thereafter, the procedure advances to step S110 of the flow of FIG. 24.

Returning back to FIG. 24, step S110 executed after returning from step S520 or step S530 and step S120 to step S170 executed thereafter are sufficiently substituted by the equivalent processes to those of the flow in FIG. 9 and will not again be described in detail.

According to this modification example, the winding label 100 including the aim lines M can be produced on the basis of the result of the editing by the standalone-type label producing apparatus 1. In this case, the plural aim lines M are printed to achieve the interval Δy input by the operation by the user in the label producing apparatus 1. As a result, the aim lines M can be printed in the state where the intention of the user is reflected thereon. In this case, when the interval Δy input by the operation by the user is too narrow, any aim line M is not printed (see step S520). As a result, any waste of meaninglessly printing plural aim lines M extremely closely to each other can be suppressed.

(2) Application to T-Shaped Label

In the above, as described above with reference to FIG. 3 and FIG. 4, the winding label 100 has been described taking the example of the case that the winding label 100 is the P-shaped label (see FIG. 3) with which, when the winding label 100 is attached to the adherend 20 (the cable) whose axis is in the up-down direction, to be used, the first label part 16 and the second label part 17 protrude in the right-left direction and the direction of the character strings is also the right-left direction while the winding label 100 is not limited to this. The present disclosure may be applied to a what-is-called T-shaped label with which, when this label is attached to an adherend 40 whose axis direction is the right-left direction, the first label part 16 and the second label part 17 protrude in the up-down direction and the character string direction is the right-left direction. Such a modification example will be described with reference to FIG. 26 and FIG. 27.

<Outer Appearance of Winding Label>

Figure 26A:
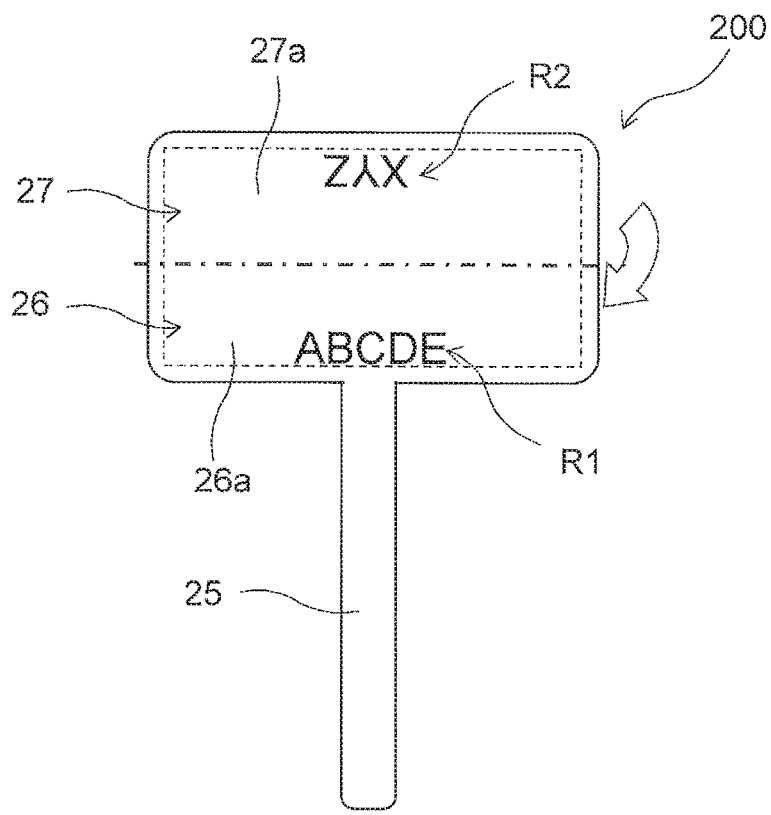
FIG. 26A is a plan view showing an outer appearance of a winding label in a modification example applied to a T-shaped label.

As shown in FIG. 26(a), the winding label 200 of this modification example includes an elongated rectangular winding part 25 extending in the up-down direction as shown, a first label part 26 including a first print face 26a that is connected in the up-down direction as shown from an end in the up-down direction (in this example, the upper end) of the winding part 25 and that has the print R1 printed thereon, and a second label part 27 including a second print face 27a that is connected on one side in the up-down direction as shown (in this example, the upper side) from the first label part 26 and that has the print R2 printed thereon, The first label part 26 and the second label part 27 each have the same rectangular shape laterally elongated in the right-left direction.

In the print R1, a character string "ABODE" is printed upright in the right-left direction being justified at the lower end on the side of the winding part 25 in the substantially central part in the right-left direction of the first print face 26a.

In the print R2, the character string "XYZ" is printed rotated by 180° to be upside-down in the right-left direction being justified at the upper end opposite to the winding part 25 in the substantially central part in the right-left direction of the second print face 27a.

Figure 26B:
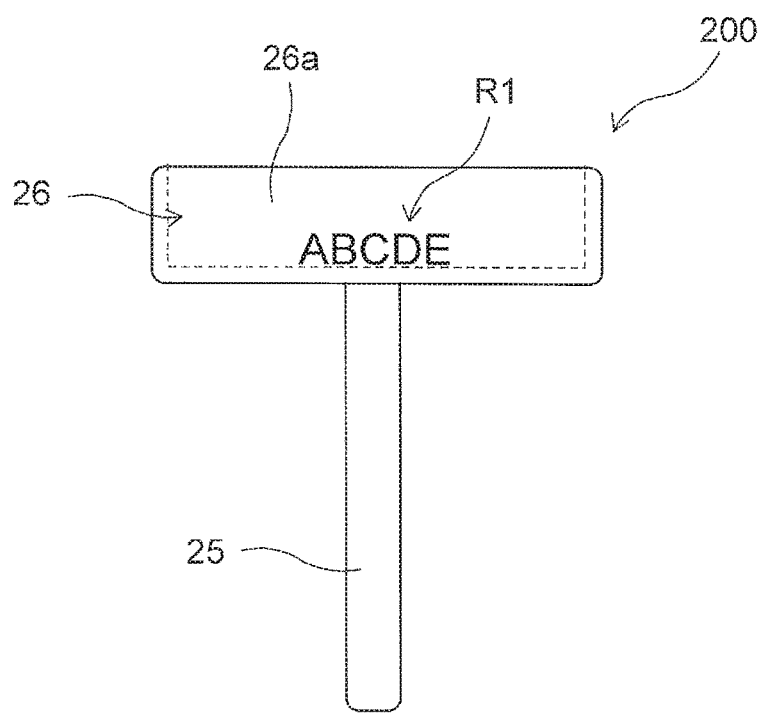
FIG. 26B is a plan view showing an outer appearance of the winding label after a second label part is folded back toward a first label part in the modification example applied to the T-shaped label.

When the winding label 200 having the above configuration is used, as shown in FIG. 26(b), first, the second label part 27 is folded back toward the first label part 26 in the form of a mountain fold (a mountain fold part is indicated by a dashed-dotted line in FIG. 26(a)) such that the print face 27a is exposed on the back face of the first label part 26, and the folded-back second label part 27 is affixed to the first label part 26 (by adhesive layers on their back faces).

<Form of Use of Winding Label>

Figure 27A:
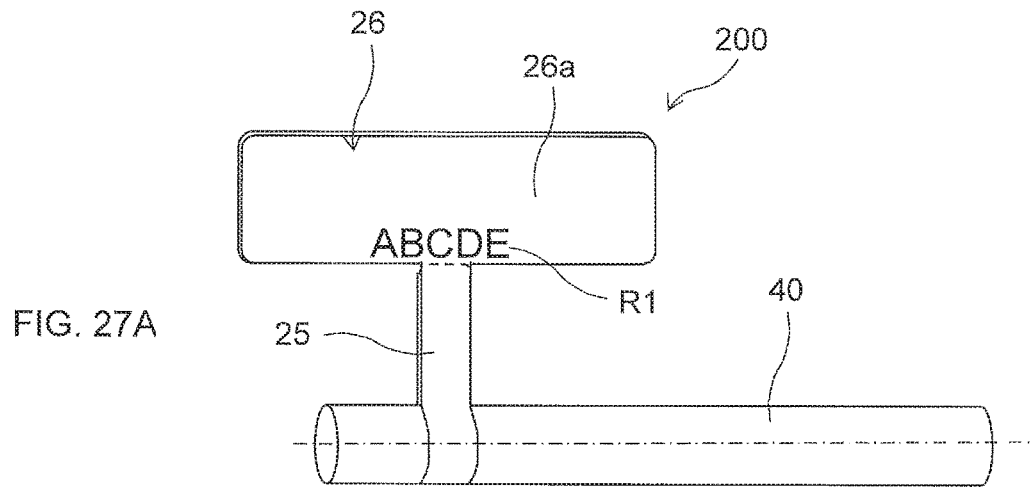
FIG. 27A is an explanatory view showing an outer appearance of the winding label used being attached to a cable.

As shown in FIG. 27(a), thereafter, the winding label 200 folded back as shown in FIG. 26(b) is wound and folded back such that the substantially central part in the up-down direction of the winding part 25 is positioned on the circumference of the circular-pipe-like or the cable-like adherend 40 whose axis direction is the right-left direction as shown (hereinafter, as necessary, simply referred to as "cable 40"). An adhesive layer on the back face of the winding part 25 causes overlapping parts generated by the folding back of the winding part 25 to adhere to each other and also causes the part wound on the circumference of the cable 40 of the winding part 25 to adhere to the circumference of the cable 40.

By executing the above, the winding label 200 is attached to the cable 40, and the first label part 26 and the second label part 27 overlapping with each other protrude in the up-down direction as shown from the winding part 25 (the what-is-called P-shaped label). FIG. 27(a) shows an outer appearance of the winding label 200 attached to the cable 40, seen from the front side (the side of the first label part 26). As shown, as to the first label part 26, the character string "ABCDE" is written upright in the position form for the character string "ABCDE" to be justified at the end of the winding part 25, in the first print face 26a.

Figure 27B:
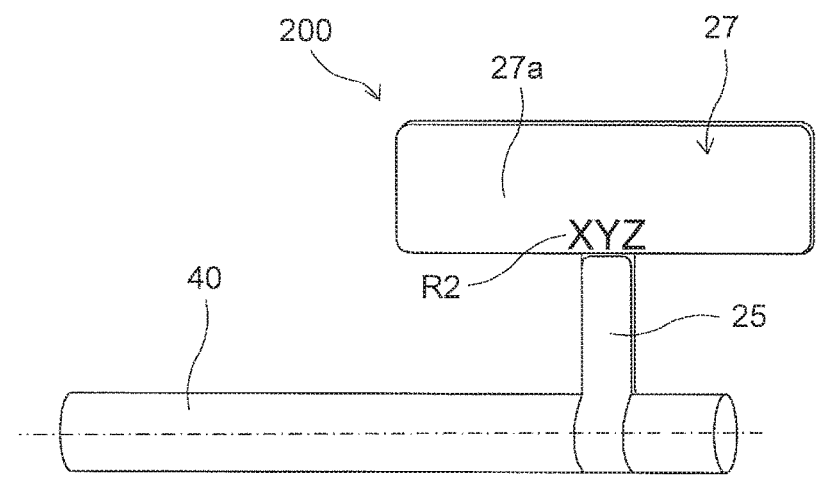
FIG. 27B is an explanatory view showing the outer appearance of the winding label used being attached to the cable.

FIG. 27(b) shows an outer appearance of the winding label 200 attached to the cable 40 seen from the back side thereof (the side of the second label part 27). As shown, as to the second label part 27, the character string "XYZ" is written upright in the position form for the character string "XYZ" to be justified at the end of the winding part 25 on the second print face 27a.

In this modification example, when the winding label 200 that is the above T-shaped label is produced, the aim lines M (not shown) can be formed by printing on the winding part 25 according to the same approach as that of each of the embodiments, and the same effects can be achieved.

When any of terms such as "vertical", "parallel", "plane", and the like is present in the above description, the term does not have any strict meaning. These "vertical", "parallel", and "plane" respectively mean "substantially vertical", "substantially parallel", and "substantially plane" each admitting a tolerance and an error in designing and production.

When any of terms such as "same", "equal", "different", and the like for dimensions and sizes concerning an outer appearance is present in the above description, the term does not have any strict meaning. These "same", "equal", and "different" respectively mean "substantially same", "substantially equal", and "substantially different" each admitting a tolerance and an error in designing and production.

When a value to be a predetermined determination criterion or a value to be a limit such as, for example, a threshold value, a reference value, or the like is present, "same", "equal", "different", and the like for the value each have a strict meaning, different from the above.

In the above, arrows shown in FIG. 1 each indicate an example of the flow of a signal and each do not limit the direction of the flow of the signal.

The flowcharts shown in FIG. 8, FIG. 9, FIG. 19, FIG. 22, FIG. 24, and FIG. 25 each do not limit the present disclosure to the procedures represented by the flows, and additions and deletions of the procedures or changes of order thereof and the like may be made within a scope not departing from the purport and the technical idea of the present disclosure.

In addition to those described above, the approaches in accordance with the embodiments and the modification examples may be used in combination thereof.

What is claimed is:

1. A label producing apparatus configured to produce a label that includes an information print part having information printed thereon and a winding part connected to said information print part and to be wound on an adherend, said label producing apparatus comprising a processor; and a memory that stores instructions that, when executed by the processor, cause the label producing apparatus to perform steps comprising:

determining a position of a mark to be formed on said winding part and to be a guidepost for a position to wind said winding part on said adherend, said determining including determining positions of plural aim lines that are to be printed on said winding part as marks and that represent respectively winding starting positions for said winding part on said adherend corresponding to plural spacing distances determined in advance along an extension direction in which said winding part extends between said information print part and said adherend;

generating mark data to form said mark at the determined position, said generating includes generating said mark data to print said plural aim lines at the determined positions;

forming said mark on said winding part based on said generated mark; and accepting a setting input for intervals of said plural aim lines, wherein in a case that a value of each of the intervals of said plural aim lines is equal to or greater than a predetermined threshold value, said determining determines positions of said plural aim lines for said plural aim lines to have the intervals and said generating generates said mark data to print said plural aim lines at the determined positions, and in a case that the value of each of the intervals of said plural aim lines is smaller than said predetermined threshold value, said determining does not determine any position of said plural aim lines and said generating does not generate said mark data.

2. A non-transitory computer-readable recording medium storing a label production process program that when executed by a computing portion of a terminal connected to a label producing apparatus that produces a label including an information print part having information printed thereon, and a winding part connected to said information print part and to be wound on an adherend, performs steps comprising:

determining a position of a mark to be formed on said winding part and to be a guidepost for a position to wind said winding part on said adherend, said determining including determining positions of plural aim lines that are to be printed on said winding part as marks and that represent respectively winding starting, positions for said winding part on said adherend corresponding to plural spacing distances determined in advance along an extension direction in which said winding part extends between said information print part and said adherend;

generating mark data to form said mark at the determined position, said generating includes generating said mark data to print said plural aim lines at the determined positions;

forming said mark on said winding part based on said generated mark; and accepting a setting input for intervals of said plural aim lines, wherein in a case that a value of each of the intervals of said plural aim lines is equal to or greater than a predetermined threshold value, said determining determines positions of said plural aim lines for said plural aim lines to have the intervals and said generating generates said mark data to print said plural aim lines at the determined positions, and in a case that the value of each of the intervals of said plural aim lines is smaller than said predetermined threshold value, said determining does not determine any position of said plural aim lines and said generating does not generate said mark data.

* * * * *